United States Patent
Higashijima et al.

(10) Patent No.: US 7,360,018 B2
(45) Date of Patent: Apr. 15, 2008

(54) STORAGE CONTROL DEVICE AND STORAGE DEVICE ERROR CONTROL METHOD

(75) Inventors: Naoki Higashijima, Tokyo (JP); Yoshihiro Uchiyama, Odawara (JP)

(73) Assignee: Hitachi, Ltd., Tokyo (JP)

( * ) Notice: Subject to any disclaimer, the term of this patent is extended or adjusted under 35 U.S.C. 154(b) by 280 days.

(21) Appl. No.: 11/138,279

(22) Filed: May 27, 2005

(65) Prior Publication Data
US 2006/0218343 A1 Sep. 28, 2006

(30) Foreign Application Priority Data
Mar. 25, 2005 (JP) ............................. 2005-088670

(51) Int. Cl.
*G06F 12/00* (2006.01)
(52) U.S. Cl. .................. 711/114; 711/154; 711/156; 714/6; 714/21; 714/48
(58) Field of Classification Search ............... 711/114, 711/154, 156; 714/6, 21, 48
See application file for complete search history.

(56) References Cited

U.S. PATENT DOCUMENTS

| | | | |
|---|---|---|---|
| RE34,100 E * | 10/1992 | Hartness | 714/769 |
| 6,128,762 A * | 10/2000 | Jadav et al. | 714/766 |
| 6,269,424 B1 | 7/2001 | Katsuragi et al. | |
| 6,944,791 B2 * | 9/2005 | Humlicek et al. | 714/6 |
| 2002/0007469 A1 * | 1/2002 | Taketa et al. | 714/6 |
| 2004/0010661 A1 | 1/2004 | Katsuragi et al. | |
| 2005/0228941 A1 * | 10/2005 | Abe et al. | 711/113 |
| 2005/0240724 A1 * | 10/2005 | Koizumi et al. | 711/113 |

FOREIGN PATENT DOCUMENTS

JP 10-149262 6/1998

* cited by examiner

*Primary Examiner*—Stephen Elmore
(74) *Attorney, Agent, or Firm*—Antonelli, Terry, Stout & Kraus, LLP.

(57) ABSTRACT

The storage control device and storage device error control method of the present invention prevent incorrect data from being read out to the host in advance, and thus improve the reliability. For example, the controller 5 that controls the disk array subsystem disperses and stores data on respective disks 1 through 3, calculates parity data, and stores this parity data on a disk 4. In cases where the updating of a certain block (D12) fails, so that data is not written into this block, this is an uncorrectable error. The data of this block (D12) is recovered on the basis of data and parity data stored on the other disks. The controller 5 also recovers data for another block (D13) following the block (D12) on the basis of other associated data and parity data. As a result, even if by some chance the block (D13) which has not suffered an uncorrectable error stores old data, the correct data can be recreated and provided to the host 7.

20 Claims, 16 Drawing Sheets

FIG. 14

| PARITY CHECK BLOCK NUMBER CONTROL TABLE ||
|---|---|
| DEVICE TYPE | NUMBER OF BLOCK S IN WHICH PARITY MATCHING IS CHECKED |
| TYPE 1 | BN1 |
| TYPE 2 | BN2 |
| TYPE 3 | BN3 |
| ... | ... |

T1

STORAGE CONTROL DEVICE AND STORAGE DEVICE ERROR CONTROL METHOD

CROSS-REFERENCE TO RELATED APPLICATIONS

This application relates to and claims priority from Japanese Patent Application No. 2005-88670 filed on Mar. 25, 2005, the entire disclosure of which is incorporated herein by reference.

BACKGROUND OF THE INVENTION

1. Field of the Invention

The present invention relates to a storage control device and a storage device error control method.

2. Description of the Related Art

For example, governments, official agencies, local governments, enterprises, educational organs and the like handle large quantities of numerous types of data, and therefore control data using relatively large-scale storage control devices. In such storage control devices, a storage region (RAID: redundant array of independent disks) that has redundancy is constructed using redundant information, and data is stored in this storage region (Japanese Patent Application Laid-Open No. 10-149262).

In such a storage device, the data is divided into units of a specified size, and is stored in dispersed form in a plurality of storage devices; furthermore, parity data is also calculated from the respective sets of data obtained by such data division, and this parity data is stored. As a result, even in cases where some single set of data is lost, the lost data can be restored (recovered) on the basis of other data and parity data.

For example, in the case of a hard disk drive, a series of sets of data are written into a plurality of sectors. In cases where the writing of data into a certain block is lost, so that the write processing is interrupted, the planned data is not written into the respective blocks following the interrupted block. In this case, the loss of writing should be detected for all of the blocks into which data has not been written.

However, it has been discovered that a phenomenon may rarely occur (depending on the trouble mode of the hard disk drive) in which the hard disk drive responds normally in spite of the fact that blocks that have failed in writing have been generated, and other blocks that are continuous with these blocks are in an unwritten state.

SUMMARY OF THE INVENTION

Accordingly, it is an object of the present invention to provide a storage control device and storage device error control method which are devised so that reliability can be improved. Furthermore, it is another object of the present invention to provide a storage control device and storage device error control method which are devised so that in cases where an error is detected in a storage device, the reliability of areas outside the range where this error is detected can be confirmed or recovered. Other objects of the present invention will become clear from the following description of embodiments.

In order to solve the abovementioned problems, the storage control device of the present invention is a storage device which is respectively connected to a host device (which can also be referred to as an upper device) and a plurality of storage devices, comprising an upper communications part (which can also be referred to as a host interface unit) for performing communications with the host device, a lower communications part (which can also be referred to as a disk interface unit) for performing communications with each of the respective storage devices, and a control part (which can also be referred to as a control unit) which constructs a redundant storage region by means of the respective storage devices, and which inputs and outputs data into and from the redundant storage region via the lower communications part on the basis of instructions from the host device received via the upper communications part. Furthermore, the control part detects whether or not a specified error has occurred in any of the respective storage devices, and in cases where this specified error is detected, respectively performs specified processing relating to this specified error for at least a unit storage region within a specified range contiguous with an error unit storage region in which the specified error was detected, among a plurality of unit storage regions belonging to the storage device in which the specified error was detected.

The redundant storage region can be constructed by dispersing and respectively storing data received from the host device in a plurality of storage devices constituting at least some of the storage devices among the respective storage devices, and storing the parity data obtained on the basis of this data in at least one storage device among the respective storage devices. For example, the control part disperses and respectively stores data in a plurality of storage devices known as RAID 3, RAID 4 and RAID 5, and stores the parity data produced from this dispersed data in a specified single storage device or plurality of storage devices. Taking three sets of data D1, D2 and D3 and one set of parity data P as an example, the parity data P is obtained by determining the exclusive logical sum of the respective sets of data D1 through D3 (P=D1 xor D2 xor D3).

Here, for example, the specified error is an error in which the data stored in the error unit storage region cannot be read out in a normal manner. Or, for example, the specified error is an error in which the data stored in the error unit storage region must be recovered on the basis of other data and parity data relating to the data stored in the error unit storage region. For example, in cases where redundant information used for error detection and error recovery such as an ECC (error correcting code) is added to the data that is written into the unit storage regions, errors that are detected by the redundant information that is integrated with this data but that cannot be recovered may also be cited as examples of the abovementioned specified error.

Here, for example, processing that recovers data stored in the unit storage regions within the specified range can be cited as an example of the specified processing. For example, the control part can respectively recover the data respectively stored in the error unit storage region and unit storage regions within the specified range on the basis of other data and parity data respectively relating to these sets of data. In other words, the lost data can be calculated on the basis of other data and parity data belonging to the same parity group as the lost data. In the abovementioned example, in cases where it is impossible to read out D1, D1 can be calculated on the basis of the other data D2 and D3 and parity data P (D1=D2 xor D3 xor P).

Furthermore, in cases where specified processing is performed, the control part can respectively store the respective sets of recovered data in other normal unit storage regions. For example, after executing the specified processing, the control part can save the respective sets of recovered data in the original storage device or in another storage device.

The control part can also test the reliability of the data stored in the unit storage regions within the specified range as the specified processing. For example, the control part can recover the data stored in the unit storage regions within the specified range on the basis of other data and parity data relating to this data, and can compare the new parity data obtained from this recovered data with parity data that has already been stored, in order to test whether or not the two sets of parity data coincide. In cases where both sets of parity data coincide, the control part can judge that the data stored in the respective unit storage regions with the specified range have been correctly updated.

The control part can also execute both data recovery processing that recovers data respectively stored in the error unit storage region and the unit storage regions within the specified range, and reliability testing processing that tests the reliability of the data stored in the unit storage regions within the specified range.

In this case, furthermore, the specified range can be set so that this rang is different in the data recovery processing and the reliability testing processing. For example, the range that is used in the data recovery processing (i.e., the beginning position and end position of this range) and the range that is used in the reliability testing processing (i.e., the beginning position and end position of this range) can be set as independent values that are different from each other. For instance, in the case of the data recovery processing, the error unit storage region can be taken as the beginning position, and the unit storage region positioned at the tail end of the read-out range indicated by the read request from the upper device can be taken as the end position. In the case of the reliability testing processing, on the other hand, the unit storage region immediately following the error unit storage region can be taken as the beginning position, and the range extending up to a specified number of unit storage regions from this beginning position can be taken as the specified range.

Furthermore, in cases where the control part executes the specified processing, the control part can also close the storage device in which the specified error has occurred. For example, the control part can prohibit the use of the storage device in which the specified error has occurred.

Furthermore, the specified range can also be determined as the maximum number of unit storage regions that can be transferred to the upper device via the upper communications part. For example, specified processing can be respectively performed for the respective unit storage regions within a specified range equal to the maximum number of unit storage regions that can be transferred in a single read request or write request. Furthermore, the specified range can also be determined on the basis of a range indicated by the upper device. For example, the read-out range is indicated by the read request from the upper device; in this case, the specified processing can be performed with the range extending from the unit storage region positioned immediately after the error unit storage region to the unit storage region positioned at the tail end of the read-out range taken as the specified range. Alternatively, the range extending from the error unit storage region to the unit storage region positioned at the tail end of the read-out range may also be taken as the specified range. Furthermore, the specified range may also be set in a variable manner. For example, for the respective unit storage regions that are contiguous with the error unit storage region, the specified processing may be respectively performed for a single unit storage region or a plurality of unit storage regions at a time.

In cases where a read request from the upper device is received by the upper communications part, the control part can detect whether or not a specified error has occurred in any of the respective storage devices. Specifically, a read request from the upper device can be used as a trigger for error detection.

Furthermore, the control part can periodically or aperiodically test a diagnosis as to whether or not the respective storage devices are operating normally. In cases where such a diagnosis is performed, the control part can also detect whether or not a specified error has occurred in any of the respective storage devices. Specifically, error detection can be performed together with diagnostic processing that has already been provided.

Furthermore, the control part can also monitor whether or not other errors of a different type than the specified error have occurred in any of the respective storage devices, and can test the reliability of the data stored in the respective unit storage regions of the storage devices on the basis of the conditions of occurrence of these other errors. For example, in cases where errors occur in numbers exceeding a specified value in the communications interface connecting the control part and the respective storage devices, it may be inferred that the possibility of occurrence of the specified error is high, and the reliability of the data stored in the respective unit storage regions may be respectively tested.

The storage device error control method according to another aspect of the present invention is an error detection and control method for use in cases where a specified error has occurred in any of a plurality of storage devices that provide a redundant storage region constructed using parity data to an upper device. This method may comprise the steps of judging whether or not a preset specified timing has arrived, detecting whether or not this specified error has occurred in any of the respective storage devices in cases where it is judged that the specified timing has arrived, and, in cases where said specified error is detected, executing specified processing related to the specified error for at least a unit storage region within a specified range contiguous to an error unit storage region in which the specified error is detected among a plurality of unit storage regions belonging to the storage device in which the specified error is detected.

Furthermore, the step of executing the specified processing may include the steps of respectively recovering the data stored in the error unit storage region and the unit storage regions within the specified range on the basis of other data and parity data respectively relating to these sets of data, and comparing new parity data obtained from the recovered data relating to the unit storage regions within the specified range with parity data that has already been stored in order to test whether or not both sets of parity data coincide.

There are cases in which all or part of the means, functions and steps of the present invention can be constructed as computer programs that are executed by a computer. In cases where all or part of the construction of the present invention is constructed from a computer program, this computer program can be distributed (and the like) in a form that is fixed on various types of storage media, or can be transmitted via a communications network.

BRIEF DESCRIPTION OF THE DRAWINGS

FIG. 5 is an explanatory diagram showing how data is recovered using parity data and the like;

FIG. 14 is an explanatory diagram showing the table that controls the number of block for which a parity check is performed;

DESCRIPTION OF THE PREFERRED EMBODIMENTS

Figure 1A:
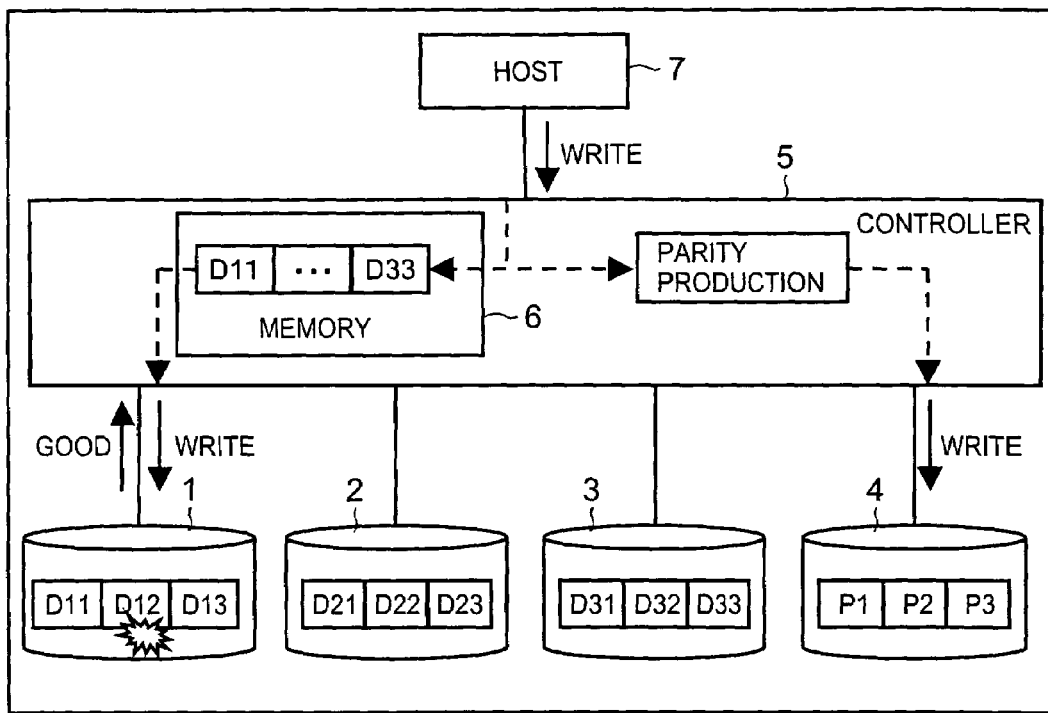
FIG. 1 (consisting of connected FIGS. 1A and 1B) is an explanatory diagram showing an overall outline of a storage control device constituting an embodiment of the present invention.
Figure 1B:
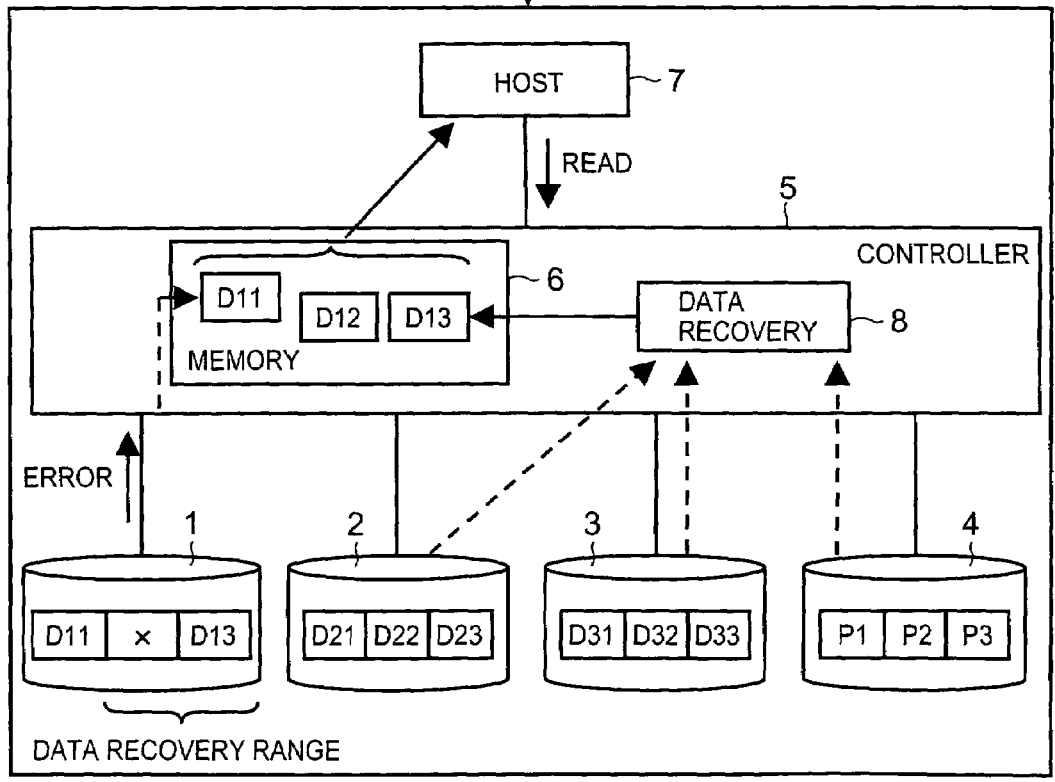

FIG. 1 (consisting of connected FIGS. 1A and 1B) is a structural explanatory diagram showing an overall outline of an embodiment of the present invention. In the present embodiment (as will be described later), data recovery and/or a data reliability check are performed for the respective blocks within a specified range contiguous to the block in which this error occurred (i.e., the error block). Specifically, in cases where an uncorrectable error is detected, the present invention avoids or prevents the improper transfer of data by performing specified processing beforehand for other blocks in which an uncorrectable error is not detected.

The storage control device of the present embodiment is respectively connected to a host (7) (which can also be referred to as an upper device) and a plurality of storage devices (1 through 4). This storage control device comprises an upper communications part (which can also be referred to as a host interface unit) for performing communications with the host (7), a lower communications part (which can also be referred to as a disk interface unit) for respectively performing communications with the respective storage devices (1 through 4), a control part (5) (which can also be referred to as a control unit) which constructs a redundant storage region by means of the respective storage devices utilizing parity data, and which inputs and outputs data to and from the redundant storage region via the lower communications part on the basis of instructions from the host (7) received via the upper communications part, and a memory (6) that is used by this control part (5).

Furthermore, the control part (5) executes the steps of judging whether or not a data read request has been issued by the host (7), successively reading out data from the respective blocks (D11 through D13, D21 through D23, D31 through D33) of the storage devices (1) through (3) storing this requested data and respectively storing this read-out data in the memory (6) in cases where a read request has been issued by the host (7), detecting an error block (D12) in which data could not be read out in a normal manner among the respective blocks (D11 through D13), respectively recovering the data stored in the respective blocks located from the error block (D12) to the block (D13) corresponding to the tail end of the read-out range indicated by the read request on the basis of other data (D22, D23, D32, D33) and parity data (P2, P3) respectively associated with these sets of data, and storing these respective sets of recovered data in the memory (6), transferring all of the sets of data included in the read-out range to the host (7) when these sets of data have been stored in the memory (6), respectively producing new parity data on the basis of the respective sets of recovered data for the respective specified blocks located from the block (D13) positioned immediately after the error block (D12) to the block corresponding to the tail end of the read-out range (this is D13 in FIG. 1; however, if a block D14 exists following D13, and this D14 is the tail end, then this final block will be D14), judging whether or not the respective sets of old parity data already stored in memory for the data stored in the respective specified blocks (D13) and the new parity data that is newly produced coincide, and closing the storage device (1) that has the error block (D12) in cases where even one combination of the respective sets of old parity data and respective sets of new parity data does not coincide.

The controller 5 is respectively connected with a plurality of storage devices 1 through 4. The controller 5 can be constructed as a computer system comprising a memory 6 and a CPU (not shown in the figures). The controller 5 respectively controls the input and output of data into and from the respective storage devices 1 through 4 in response to commands from the host 7. For example, the host 7 can be constructed as a server machine or main frame machine.

For example, the respective storage devices 1 through 4 are constructed as hard disk drives. For instance, in cases where the respective storage devices 1 through 4 are constructed as hard disk drives, these respective storage devices 1 through 4 each comprise one or a plurality of disks, a rotating mechanism that causes rotation of the respective disks, a magnetic head that is used to perform reading and writing on the respective disks, and a head driving mechanism that is used to move this magnetic head. A plurality of tracks are concentrically formed on each disk, and these respective tracks are divided into sectors in a radial configuration from the center of the disk, so that each track is divided into a plurality of sectors. These sectors are the smallest storage units of the hard disk drives.

The controller 5 produces logical storage regions on the basis of the physical storage regions respectively possessed by the respective storage devices 1 through 4. For example, these logical storage regions comprise redundant structures such as RAID 3, RAID 4 and RAID 5. In the example shown in the figures, data is stored in the storage devices 1 through 3, and parity data is stored in the storage device 4. The storage devices 1 through 3 are also called data disks, and the storage device 4 is also called a parity disk. However, it is not necessary that parity data be stored in only a single specified storage device 4; this parity data may also be respectively dispersed and stored in the respective storage devices 1 through 4.

In cases where a write request is issued by the host 7, the controller 5 splits the write data received from the host 7, and respectively stores this write data in dispersed form in the respective sectors of the respective storage devices 1 through 4. For example, the controller 5 splits the write data received from the host 7 into data D11, D12, D13, D21, D22, D23, D31, D32 and D33 for each sector (block), and stores these split sets of data in dispersed form in the respective storage devices 1 through 3. In the example shown in the figures, D11 through D13 are stored in the first storage device 1, D21 through D22 are stored in the second storage device 2, and D31 through D33 are stored in the third storage device 3.

Furthermore, the controller 5 respectively produces parity data P1 through P3 from the respective sets of data D11 through D33, and stores this parity data in the fourth storage device 4. Here, the parity data P1 is produced on the basis of the data D11, D21 and D31, the parity data P2 is produced on the basis of the data D12, D22 and D32, and the parity data P3 is produced on the basis of the data D13, D23 and D33. Even in cases where one set of data within a combination of data groups have common parity data is lost, the lost data can be recovered on the basis of the other data and parity data.

In an ordinary case, when data is written into the respective blocks in an ordinary manner, the storage devices 1 through 4 notify the controller 5 that writing has been performed in an ordinary manner. If for some reason the write processing should be interrupted while data is being written into a block, the storage device notifies the controller 5 that writing has failed. FIG. 1 (*a*) shows the failure of writing into D12. In a case where writing into D12 fails, write processing (updating processing) into the subsequent D13 is likewise not performed. Accordingly, the contents of D13 remain "as is" as the old data prior to updating.

However, it has been ascertained that there may on rare occasions be cases in which the failure of writing cannot be detected in spite of the fact that the writing of data into D12 has failed, and writing is not performed into D13 following D12. In such cases, when the read-out of D11 through D13 is requested by the host 7, D11, which has been updated in a normal manner, can be read out "as is" from the storage device 1, as shown in FIG. 1 (*b*). Next, in the case of D12, in which writing has failed, since the data error cannot be restored by means of an ECC or the like, this data is recovered on the basis of the other data D22, D32 and P2. In the case of an ECC, only some of the bits in the block can be repaired, although this also depends on the number of bits of the ECC.

Since D13 has not been updated at all, it cannot be detected whether or not this set of data has been updated in the case of the ECC associated with D13. Accordingly, from the controller 5, it appears as though the stored contents of D13 are correct. However, in the abovementioned rare cases, since the contents of D13 have not been updated, this data remains as old data. Accordingly, if the host 7 utilizes the data of D13 "as is", business processing will be performed on the basis of old data (incorrect data) prior to updating.

Accordingly, in the present embodiment, in cases where it is detected that an uncorrectable error has occurred in D12 when D12 is read out, the blocks in a specified range following D12 (D13 in the case shown in the figures) are also recovered on the basis of the other data D23, D33 and P3, regardless of whether or not an error has actually occurred in any of these blocks. Accordingly, the data recovery processing 8 of the controller 5 is respectively performed for D12, in which an uncorrectable error has occurred, and for D13 that follows D12.

Furthermore, it is also possible to verify whether or not the stored contents of D13 are correct after this D13 is first read out from the memory 6. The verification of whether or not the stored contents are correct can be accomplished by comparing the parity data (old parity data) that has been stored in memory in association with this data, and the parity data (new parity data) that has been re-calculated for the newly revised data. For example, this parity data comparison processing may be called a "parity matching check". This parity matching check is a prerequisite for the data recovery processing by XOR calculations; accordingly, the response performance of the controller 5 is enhanced if the data is fires recovered and transferred to the host 7, and a parity matching check is performed afterward.

Thus, in the present embodiment, a construction is used which is such that in cases where an uncorrectable error is detected, data is also recovered on the basis of parity data and the like for blocks other than the block in which this uncorrectable error was detected. Accordingly, even if by some chance other blocks following the block in which the uncorrectable error is detected are not correctly updated, the provision of data prior to updating to the host 7 can be prevented beforehand, so that the reliability can be improved. Below, the present invention will be described in detail in terms of examples.

1. First Example

Figure 2:
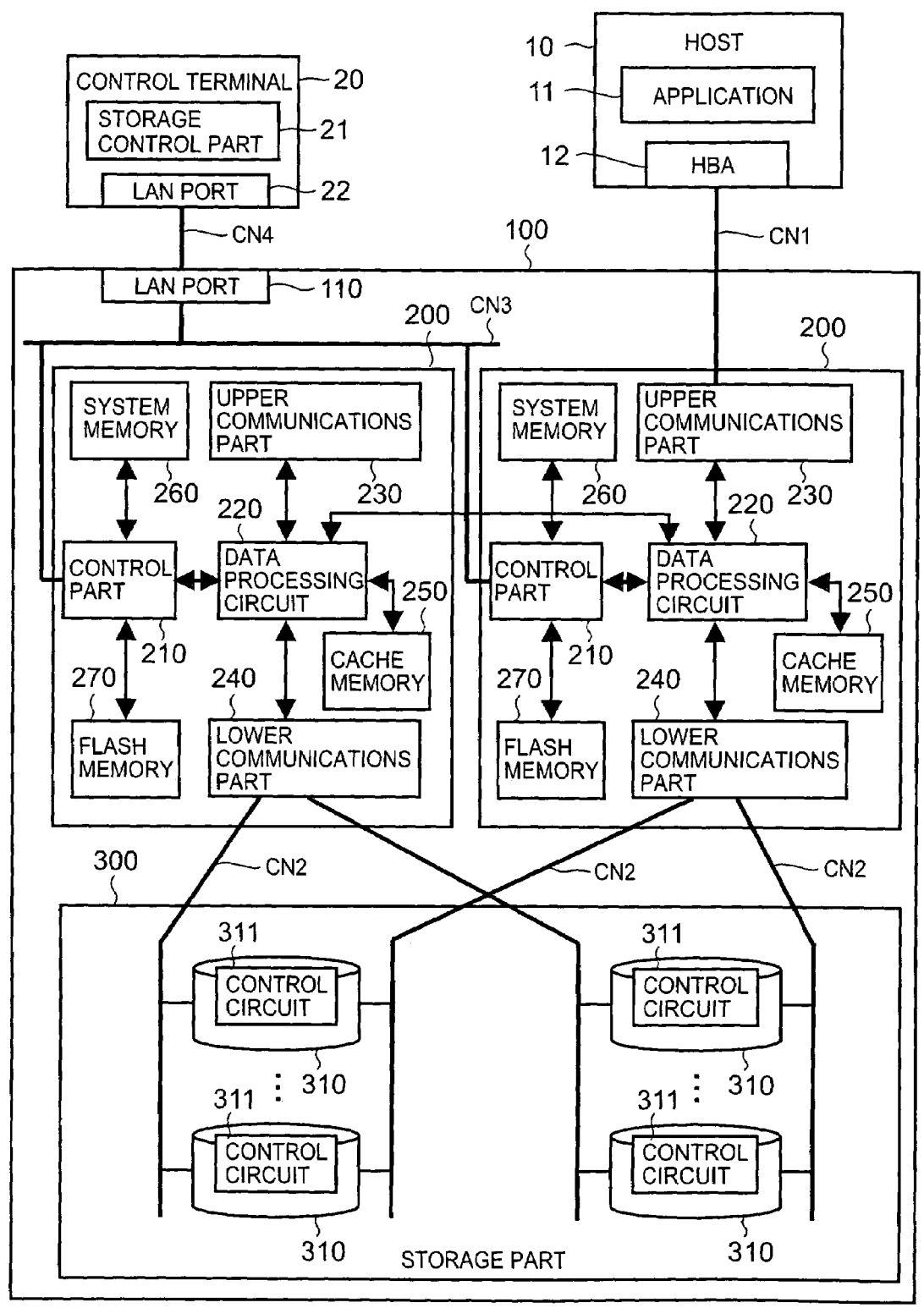
FIG. 2 is a block diagram of the storage system.

FIG. 2 is a block diagram which shows the overall construction of the storage system of the present example. As will be respectively described later, for example, this storage system can be constructed from a host 10, a control terminal 20, and a disk array subsystem 100.

For example, the host 10 is a computer device comprising information processing resources such as a CPU (central processing unit), memory and the like. For instance, this host 10 can be constructed as a personal computer, workstation, main frame or the like. For example, the host 10 comprises an application program 11, and an HBA (host bus adapter) 12 that is used to access the disk array subsystem 100 via a communications network CN1.

For example, an LAN (local area network), SAN (storage area network), the internet, dedicated circuit, public circuit or the like can be used as the communications network CN1. For instance, data communications via an LAN are performed according to a TCP/IP protocol. In cases where the host 10 is connected to the disk array subsystem 100 via an LAN, the host 10 requests the input and output of data in file units by designating file names.

In cases where the host 10 is connected to the disk array subsystem 100 via an SAN, the host 10 requests the input and output of data in units of blocks, which are data control units of the storage region provided by a plurality of disk drives, in accordance with a fiber channel protocol. In cases where the communications network CN1 is an LAN, furthermore, the HBA 11 is (for example) a network card that can handle an LAN. In cases where the HBA 11 is an SAN, the HBA 11 is (for example) a host bus adapter.

Furthermore, in cases where the host 10 is constructed as a main frame, for example, the host 10 transfers data according to a communications protocol such as FICON (Fiber Connection: registered trademark), ESCON (Enterprise System Connection: registered trademark), ACON-ARC (Advanced Connection Architecture: registered trademark), FIBARC (Fiber Connection Architecture: registered trademark) or the like.

The control terminal 20 is a computer device that is used to control the construction of the storage system and the like. For example, this terminal is operated by a user such as the system manager or the like. The control terminal 20 is connected to the disk array subsystem 100 via a communications network CN4. For example, the control terminal 20 can be constructed so that this terminal comprises storage control part 21, and an LAN port 22 which is used for connection to the communications network CN4. For example, the storage control part 21 is constructed as software, and gives various types of instructions to the disk array subsystem 100. As a result of these instructions, control information, tables and the like in the disk array subsystem can be rewritten. Furthermore, the control terminal 20 can also acquire various types of information 20 from the disk array subsystem 100, and can display this information on the terminal screen.

The disk array subsystem 100 can be divided mainly into a plurality of controllers 200 and a storage part 300. The respective controllers 200 process commands from the host 10, and perform the input and output of data into and from the storage part 300. The respective controllers 200 are duplexed, with both controllers having the same construction.

Next, one controller 200 will be described. For example, the controller 200 can be constructed so that this controller comprises a control part 210, a data processing circuit 220, an upper communications part 230, a lower communications part 240, a cache memory 250, a system memory 260, and a flash memory 270.

For example, the control part 210 is constructed as a CPU. The control part 210 controls the overall operation of the controller 200 by reading out program codes stored in the flash memory 270 and executing these program codes. The control part 210 can utilize the system memory 260 in executing the program codes.

The data processing circuit 220 is a hardware circuit that controls the input and output of user data into and from the host 10. The data processing circuit 220 stores write data received from the host 10 in the storage part 300, reads out read data requested by the host 10 from the storage part 300 or cache memory 250, and transmits this read data to the host 10. The control part 210 and data processing circuit 220 are connected, and the control part 210 can be connected to the cache memory 250 and the like via the data processing circuit 220. Furthermore, the data processing circuit 220 of one controller 200 and the data processing circuit of another controller 200 are connected to each other; as a result, cooperative operation can be performed between the respective controllers 200.

The upper communications part 230 is used to perform communications with the host 10. The upper communications part 230 can be respectively connected to a plurality of hosts 10, and can independently perform communications with these respective hosts 10. The lower communications part 240 is used to perform communications with the storage part 300. The lower communications part 240 is respectively connected to a plurality of disk arrays via a plurality of paths CN2. After the write data received by the upper communications part 230 from the host 10 is stored in the cache memory 250, this data is written into a specified disk drive 310 via the lower communications part 240. The data that is read out form the specified disk drive 310 by the lower communications part 240 is stored in the cache memory 250, and is then transmitted to the host 10 by the upper communications part 230.

Furthermore, the control parts 210 of the respective controllers 200 are connected to the LAN port 110 via a communications network CN3 such as an LAN or the like. The LAN port 110 is used to perform communications with the control terminal 20. The respective control parts 210 can communicate with each other via the communications network CN3. Furthermore, the control terminal 20 can respectively collect information from the respective controllers 200, and give necessary instructions to the respective controllers 200, via the communications network CN3.

The storage part 300 comprises a plurality of disk drives 310. Various types of storage devices such as hard disk drives, flexible disk drives, magnetic tape drives, semiconductor memory drives, optical disk drives, holographic memory drives and the like, or the equivalents of such storage devices, can be used as the disk drives 310. Furthermore, for example, different types of disk drives such as FC (fiber channel) disks, SATA (serial AT attachment) disks or the like can also be mixed inside the storage part 300. In the present example, a cases in which the disk drives 310 are hard disk drives is described as an example.

The respective disk drives 310 each comprise a control circuit 311. For example, this control circuit 311 controls the rotation of a magnetic disk, driving of a magnetic head or the like. The control circuit 311 performs the writing of data onto the magnetic disk or read-out of data from the magnetic disk on the basis of commands from the lower communications part 240. The respective disk drives 310 are respectively connected to the respective controllers 200 via respectively different paths CN2. Accordingly, even if trouble should occur in one controller 200 or path CN2, the input and output of data can be performed via another controller 200 and path CN2.

Figure 3:
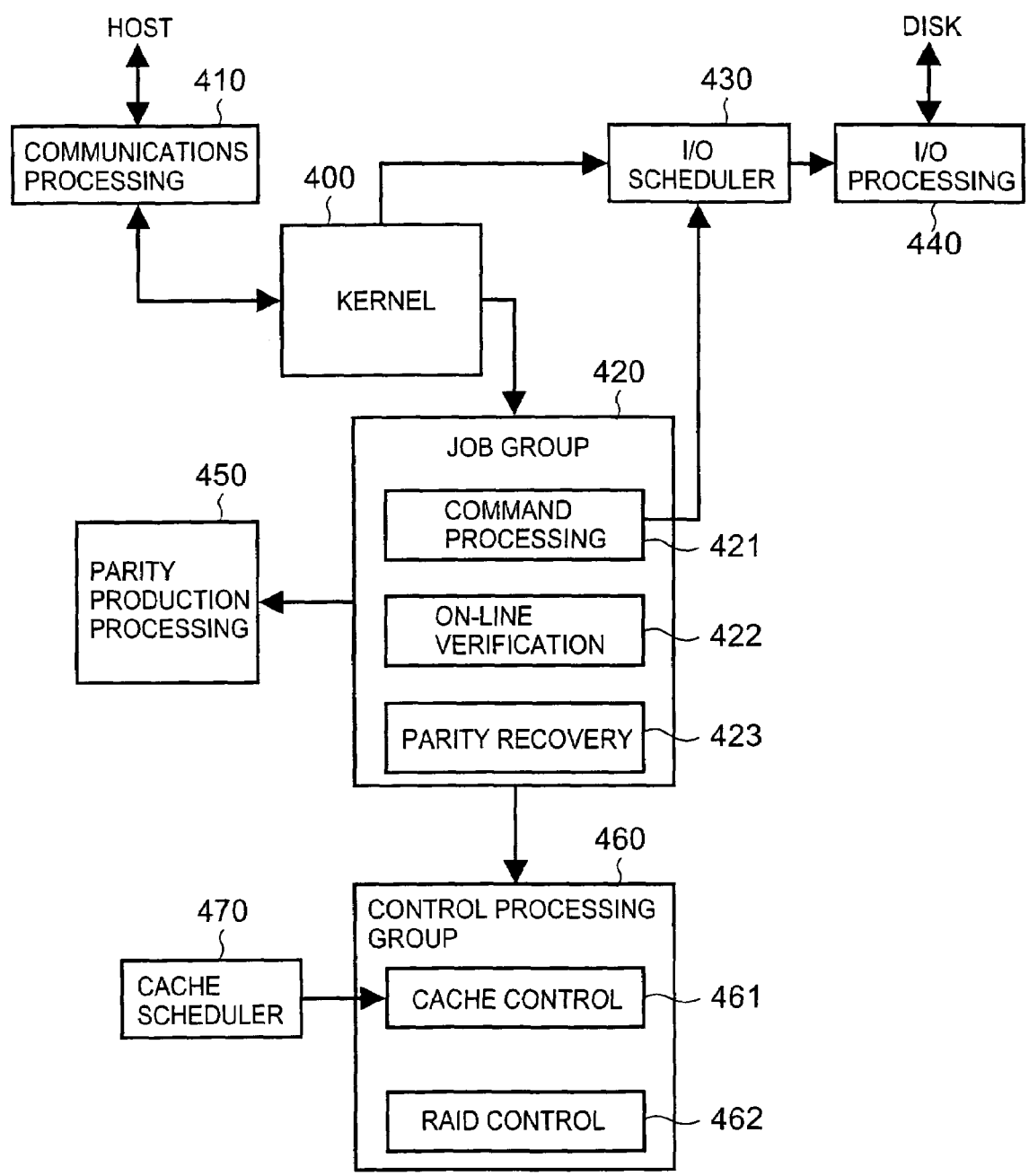
FIG. 3 is an explanatory diagram showing the control structure of the storage control device.

FIG. 3 is a block diagram which shows an outline of the control structure of the controllers 200. The kernel 400 receives data and commands from the host 10 via communications processing 410. The kernel 400 executes respective jobs registered in the job group 420 at respective specified timings.

For example, the job group 420 includes command processing 421, on-line verification processing 422, and parity recovery processing 423. The command processing 421 is produced on the basis of commands received from the host 10. The on-line verification processing 422 is processing that is used to perform a diagnosis of the disk drives 310. In an example described later, the system is devised so that a parity check is performed for the disk drives 310 in a specified range when on-line verification processing is executed. The parity recovery processing 423 is processing that recovers (restores) data on the basis of parity data and other data.

The I/O (input/output) scheduler 430 controls the timing of data input and output into and from the disk drives 310. The I/O processing 440 is processing that is used to read and write data from and into the disk drives 310. The parity production processing is processing that is used to produce parity data by performing XOR calculations with a plurality of sets of data. Furthermore, for example, besides the processing shown in the figures, processing that is used to stop planning, staging processing that is used to store data in the cache memory 250 from the disk drives 310, restoration control processing and the like may also be included in the job group.

For example, the control processing group 460 can include cache control processing 461, and RAID control processing 462. The cache control processing 461 controls the input and output of data and the like into and from the cache memory 250 on the basis of instructions from the cache scheduler 470. For example, the cache control processing 461 controls the respective cache memories 250 so that the write data (duty data) prior to destaging processing is respectively held by the cache memories 250 of the respective controllers. The RAID control processing 462 constructs a RAID group by means of a specified number of disk drives 310, and is used to produce a redundant storage region. Furthermore, besides the processing shown in the figures, the control processing group 460 may include (for example) inter-controller communications processing, resource control processing and the like.

Figure 4:
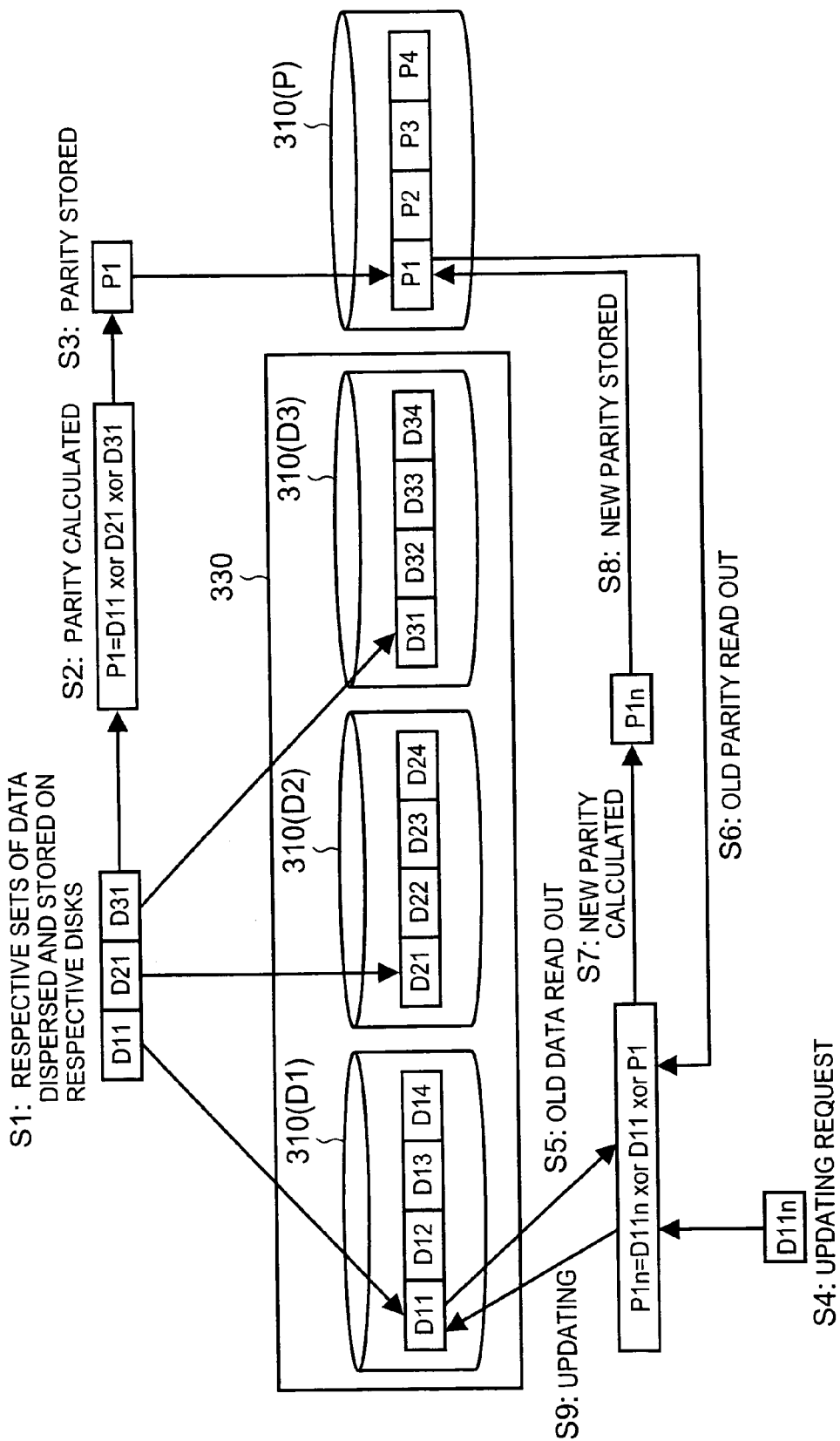
FIG. 4 is an explanatory diagram showing how the redundant storage structure is constructed using parity data.

FIG. 4 is an explanatory diagram which shows the construction and data input-output method of the redundant storage region. In this example, for convenience of description, a case in which three disk drives 310 are used as data disks and one disk drive 310 is used as a parity disk is described as an example. However, the present invention is not limited to this; data and parity data may also be respectively dispersed and stored in respective disk drives 310, so that the system would be known as RAID 5. Furthermore, the number of disk drives 310 that form a single parity group is not limited to three.

As is shown in FIG. 4, the disk drives 310 (D1) through 310 (D3) are respectively used as data disks, and the disk drive 310 (P) is used as a parity disk. Below, there may be cases in which the disk drives 310 that store data are called "data disks", and the disk drives 310 that store parity data are called "parity disks".

When a write command is issued by the host 10, and the controller 200 receives write data, this write data is split into D11, D21 and D31, and these sets of data are respectively stored in specified sectors of the respective data disks 310 (D1) through 310 (D3) (S1). When the controller 200 stores the data D11, D21 and D31, the controller 200 calculates the parity data P1 from these sets of data (S2: P11=D11 xor D21 xor D31), and the controller 200 stores the calculated parity data P1 on the parity disk 310 (P) (S3).

In cases where the host 10 requests updating of the data D11, the host 10 transmits the new data D11$n$ to the controller 200 (S4). Before storing the data D11$n$ in the in the specified data disk 310 (D1), the controller 200 reads out the old data D1 from the data disk 310 (D1) (S5), and reads out the old parity data P1 from the parity disk 310 (P) (S6).

The controller 200 calculates new parity data P1$n$ from the old data D11, new data D11$n$, and old parity data P1 (S7: P1$n$=D11$n$ xor D11 xor P1). Instead of using this calculation method, it would also be possible to calculate the new parity data P1$n$ from D11$n$, D21 and D23. However, in the latter calculation method, since all of the old data is read out, the calculation time is increased in cases where the number of data disks is large. In the former method, the new parity data can be obtained without regard to the number of data disks.

The controller 200 stores the new parity data P1$n$ on the parity disk 310 (P) (S8). Then, the controller 200 writes over the old data D11 with the new data D11$n$ (S9). Thus, in cases where a portion of the associated data (D11, D21, D31) is updated, the parity data is again calculated and updated.

Figure 5:
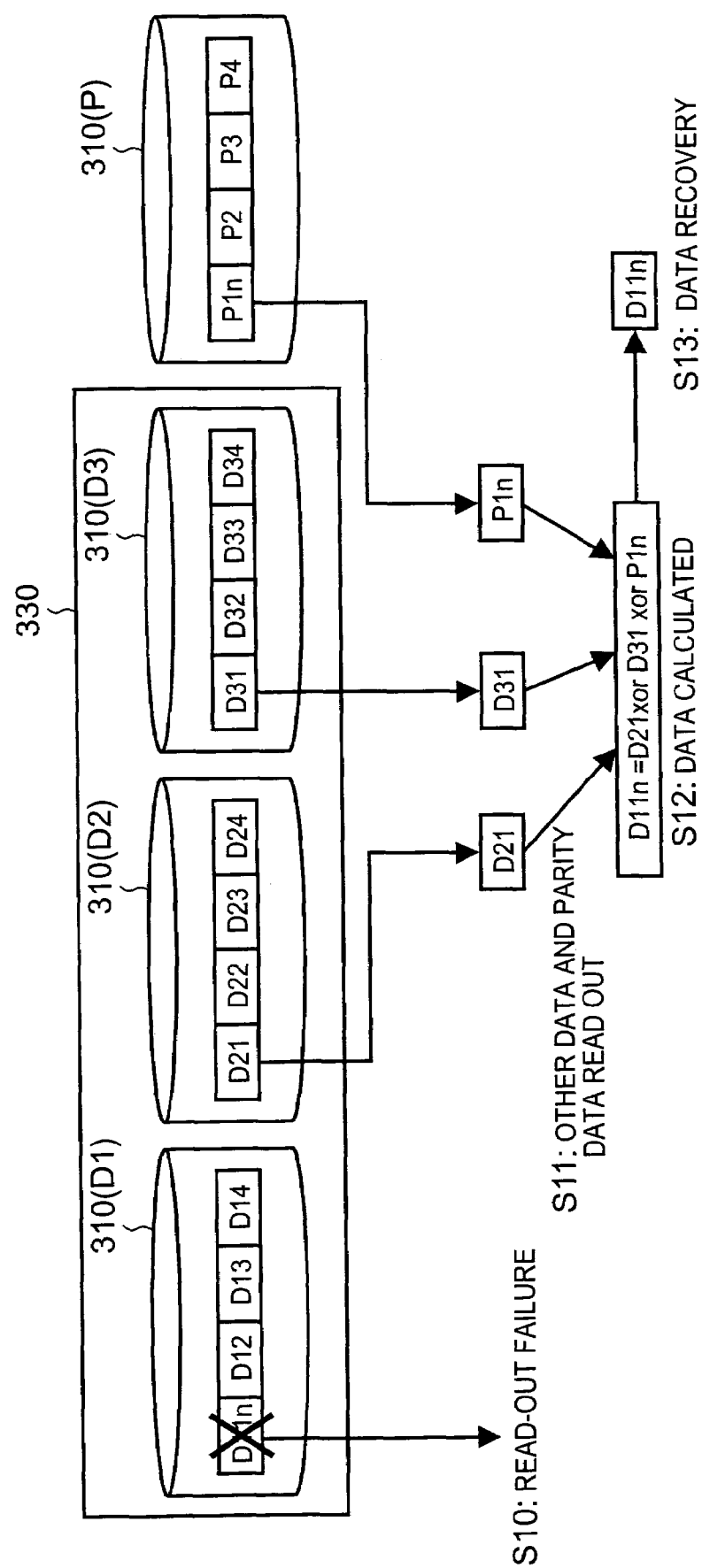

FIG. 5 is an explanatory diagram showing how data is restored using parity data. For example, let us assume that for some reason, the write processing of the data D11$n$ that is to be updated in FIG. 4 actually fails.

Since an ECC of specified bits is added to the data D11$n$, a slight bit error can be automatically corrected. However, in cases where a bit error exceeding the correction capacity of the ECC occurs, the data D11$n$ cannot be read out from the data disk 310 (D1) in a normal manner (S10). Such a read-out error is called an uncorrectable error.

Accordingly, the controller 200 respectively reads out respectively reads out the other data D21 and D31 and parity data P1$n$ associated with the D11$n$ that has failed in this read-out (S11), and calculates the data D11$n$ (S12: D11$n$=D21 xor D31 xor P1$n$). The data D11$n$ that is thus recovered is transferred to the host 10. Thus, even if only a single set of data or parity data is lost among the combinations of data and parity data, the lost data can be recovered by means of the other remaining data.

Figure 6:
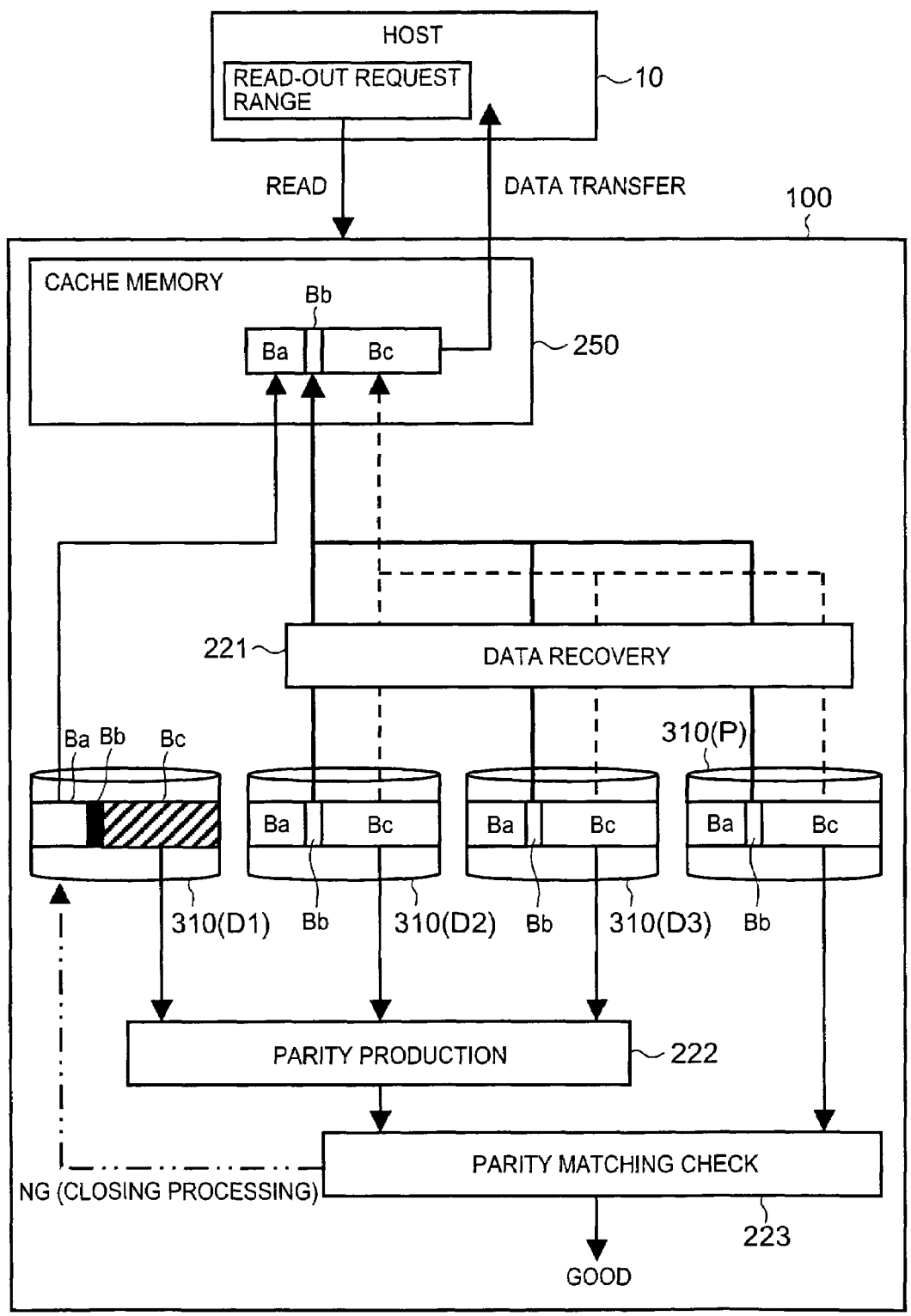
FIG. 6 is an explanatory diagram showing the main structure of the storage control device seen from one viewpoint.

FIG. 6 is a structural explanatory diagram showing the main functions of the present example as seen from one standpoint. Here, it is assumed that as a result of an updated request (write request) from the host 10, data is written in a normal manner into the block region Ba of the data disk 310 (D1), and that an uncorrectable error has occurred in the next block region Bb. The final block region Bc is a region in which it is unclear whether or not updating has been performed in a normal manner. For example, the block region Ba can be called a "normal region", the block region Bb can be called an "error region", and the block region Bc can be called a "region requiring confirmation" or an "unconfirmed region". Each of the block regions Ba, Bb and Bc is constructed from one or more blocks (sectors). However, there are also cases in which Ba and Bc are respectively zero (Ba=Bc=0).

When the host 10 requests data read-out, the host 10 issues a read command to the controller 200, designating the read-out range. Here, the respective block regions Ba, Bb and Bc of the data disk 310 (D1) are designated as the read-out range.

In the initial block region Ba, since data updating has been performed in a normal manner, the data can be read out "as is" in a normal manner. The data that is read out from the block region Ba is stored in the cache memory 250.

In the next block region Bb, since an uncorrectable error has occurred, the data cannot be read out. Accordingly, the data that was to be stored in the block region Bb is recovered by data recovery processing 221 on the basis of other data and parity data relating to this data. Specifically, data or parity data is respectively read out from the respective corresponding block regions Bb of the other data disks 310 (D2) and 310 (D3) and parity disk 310 (P), and XOR calculations are performed. As a result, the data of the block region Bb of the data disk 310 (D1) can be recovered. Furthermore, the data recovery processing 221 and the parity production processing 222 and parity matching check processing 223 described later are respectively performed by (for example) the data processing circuit 220.

Furthermore, the data recovery processing 221 also performs data recovery for the block region Bc that follows the block region Bb, in addition to data recovery for the block region Bb.

In other words, in cases where an uncorrectable error is detected, the data recovery processing 221 respectively recovers the respective sets of data stored in the respective blocks from the position where the uncorrectable error has occurred to the final position of the read-out range designated by the host 10 on the basis of parity data and other data respectively corresponding to these sets of data. The data recovery processing 221 respectively recovers the respective data regardless of whether or not the data stored in the respective other blocks contiguous to the block in which the uncorrectable error was detected are correct. The data recovery processing 221 respectively recovers the data in the respective blocks contained in the block region Bc, and stores these respective sets of recovered data in the cache memory 250.

As a result, since all of the data in the range requested by the host 10 is accommodated in the cache memory 250, the controller 200 transfers the data read out from the cache memory 250 to the host 10.

Furthermore, the abovementioned description refers to a case in which the host 10 and controller 200 communicate at the maximum data size that can be transmitted in one transfer (the maximum transfer size). The host 10 can designate the read-out range as the maximum data size. After the data in the designated range has been gathered together, the controller 200 transfers this data to the host 10. As a result of this communication at the maximum data size, the number of times that communication is performed between the host 10 and the controller 200 can be reduced, so that the respective loads on the host 10 and controller 200 can be reduced. However, the present invention is not limited to this; it would also be possible to use a construction in which data read out from the cache memory 250 is successively transferred to the host 10 without waiting for all of the data in the read-out range to be collected. For example, the data in the range designated by the host 10 can also be transferred to the host 10 in several transfers.

After the controller 200 processes the read request from the host 10, or while the controller 200 is processing this read request, a check of parity matching is performed. The parity production processing 222 that is executed by the data processing circuit 220 respectively produces new parity data on the basis of the data respectively stored in the block regions Bc of the respective data disks 310 (D1) through 310 (D3). The parity matching check processing 223 that is executed by the data processing circuit 220 respectively compares the respective newly calculated parity data with the respective parity data belonging to the block region Bc already stored on the parity disk 310 (P).

In cases where the respective re-calculated parity data and the respective parity data that have already been stored coincide, it can be judged that the block region Bc of the data disk 310 (D1) in which an uncorrectable error was detected is normal. The term "normal" means that data was correctly written into the respective blocks contained in the block region Bc at the time of the previous updating.

Accordingly, the occurrence of an uncorrectable error was detected in the data disk 310 (D1); however, this disk continues to be usable "as is". In cases where the data disk 310 (D1) continues to be used, the respective data recovered for the block region Bb in which the error occurred can be stored in an extra block region or in the same block region Bb. The respective disks (disk drives) each have several extra blocks, and the system is devised so that these extra blocks can be used in place of blocks in which trouble has occurred.

Conversely, in regard to the block region Bc, in cases where even a portion of the respective sets of parity data calculated on the basis of the respective data stored on the respective data disks 310 (D1) through 310 (D3) and the respective sets of parity data stored on the parity disk 310 (P) do not coincide, the reliability of the data disk 310 (D1) drops.

The block region Bc in which errors may be mixed has a greater deleterious effect on the reliability of the data disk 310 (D1) than the block region Bb in which an error is clearly detected. The block region Bc of the data disk 310 (D1) behaves as though it has been updated in a normal manner in spite of the fact that the data was not updated at the time of the previous write request. Accordingly, the controller 200 determines the use history of the data disk 310 (D1), and performs closing processing for this data disk 310 (D1). In this closing processing, the data disk 310 (D1) is cut off from the disk array subsystem, and an extra data disk is used instead of the data disk 310 (D1). The data that was stored on the data disk 310 (D1) is recovered on the basis of parity data and the like, and is stored on the extra data disk.

Figure 7:
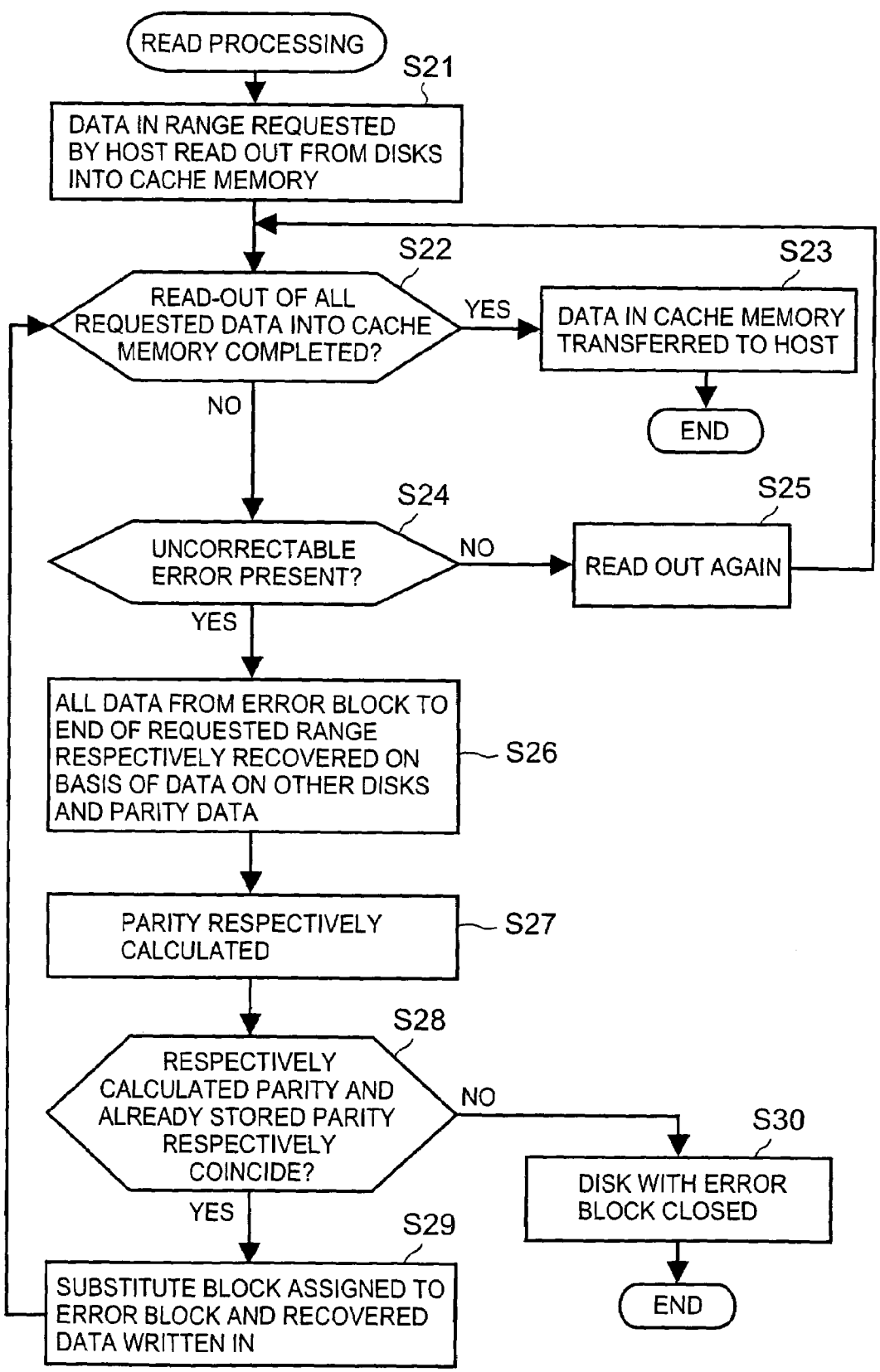
FIG. 7 is a flow chart showing the processing that is performed when a read request is received.

FIG. 7 is a flow chart which shows the read request processing. As is also true in each of the flow charts shown below, the respective flow charts show an outline of the processing, and differ from the actual programs.

This processing is initiated when the controller 200 receives a read command from the host 10. The controller 200 analyzes the read command, and ascertains the address (LBA: logical block address) and block number of the block where read-out is initiated. The controller 200 respectively reads out data in order from this starting block for the range for which read-out is requested, and stores this data in the cache memory 250 (S21).

The controller 200 judges whether or not all of the data requested by the host 10 (or the data that can be transferred in a single transfer) has been read out from the cache memory 250 (S22). In cases where all of the requested data has been read out from the cache memory 250 in a normal manner without any abnormalities in the respective disk drives 310 relating to the read request (S22: YES), the controller 200 transfers the data in the cache memory 250 to the host 10 (S23). As a result, this processing ends in a normal manner.

On the other hand, in cases where even a portion of the data requested by the host 10 cannot be read out (S22: NO), the controller 200 judges whether or not an uncorrectable error has occurred in the range for which read-out is requested (S24).

In cases where an uncorrectable error has not occurred (S24: NO), the controller 200 again tries to read out data from the block from which data could not be read out (S25). Then, the controller 200 again judges whether or not all of the data has been successfully read out from the cache memory 250 (S22). If all of the data has been successfully read out (S22: YES), this data is transferred to the host 10 (S23). Furthermore, in cases where the data cannot be successfully read out even after a specified number of tries, the processing can be ended as an error (not shown in the figures).

In cases where the occurrence of an uncorrectable error is detected (S24: YES), data is respectively recovered for the blocks extending from the block in which the uncorrectable error occurred up to the block corresponding to the tail end of the read-out range (S26).

Furthermore, the controller 200 respectively recalculates parity data for the respective blocks extending from the block that is positioned immediately after the block in which the uncorrectable error is detected (error block) to the block corresponding to the tail end of the read-out request range (S27). Then, the controller 200 compares the respective sets of parity data (old parity data) read out from the parity disk with the newly calculated parity data (new parity data), and judges whether or not all of the sets of data of both groups coincide (S28).

If all of the respective sets of old parity data and respective sets of new parity data coincide (S28: YES), the controller 200 executes recovery processing for the block in which an uncorrectable error was detected (S29). In this recovery processing, an extra substitute block is assigned to the error block, and the data recovered for the error block is written into the substitute block.

On the other hand, in cases where even a portion of the respective sets of old parity data and respective sets of new parity data do not coincide (S28: NO), the controller 200 executes closing processing for the for the disk drive 310 that contains the error block (S30). In this closing processing, for example, the disk drive 310 in which the uncorrectable error was detected is logically cut off from the from the storage part 300, and the use of this disk drive is prohibited. The data that was stored in this disk drive 310 is saved in an extra disk drive.

Figure 8:
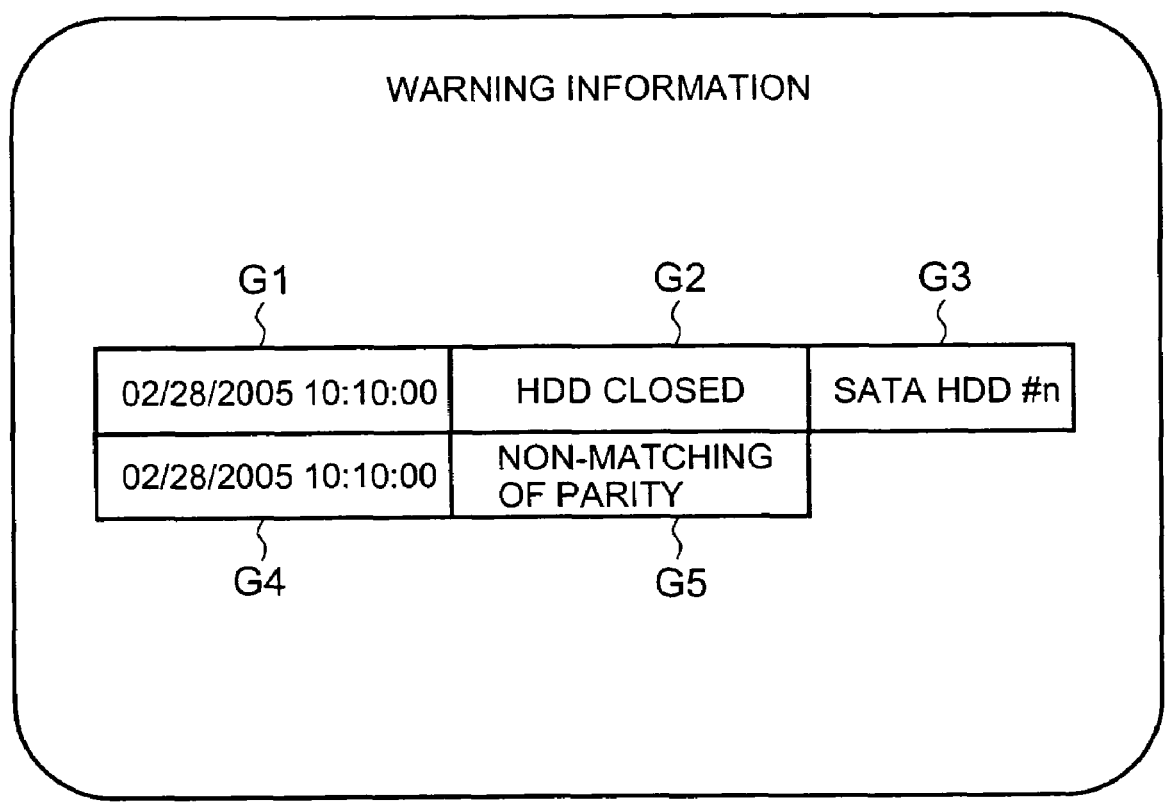
FIG. 8 is an explanatory diagram showing an example of the warning screen that is used when incorrect data is discovered.

FIG. 8 is an explanatory diagram which shows examples of warnings that are displayed on the terminal screen of the control terminal 20. On the basis of information from the controller 200, the storage control part 21 of the control terminal 20 produces a warning screen such as that shown in FIG. 8, and provides this warning screen to a user such as the system manager or the like.

For example, the warning screen may include regions G1 and G4 which display event occurrence times, regions G2 and G5 which display the contents of events, and a region G3 which displays the details of events. For instance, "closing of disk drive" (G2), "occurrence of non-matching between old and new parity" (G5) and the like may be cited as examples of event contents relating to the present example. Furthermore, for instance, discriminating information (drive number or the like) that specifies the disk drive 310 subjected to closing processing may be cited as an example of detailed event information.

In the present example constructed as described above, the following effects are obtained. In the present example, a construction is used in which the data of the error block is recovered, and data recovery processing 221 and parity matching check processing 223 using parity data are respectively performed for the respective blocks in a specified region contiguous with the error block (the respective blocks in the unconfirmed region), in cases where the occurrence of an uncorrectable error is detected. Accordingly, the possibility that erroneous data that has not been updated will be read out to the host 10 can be reduced; furthermore, a judgment as to whether or not use is to be continued can be made after the reliability of the disk drives 310 is confirmed. As a result, the reliability of the disk array subsystem 100 can be improved.

In the present embodiment, a construction is used which is devised so that in cases where non-matching between old and new parity is detected as a result of a parity matching check regarding the respective blocks of the unconfirmed regions, the disk drive 310 that contains the error block is subjected to closing processing. As a result, the continued use of a disk drive 310 with low reliability can be prevented in advance, so that the reliability of the disk array subsystem 100 is improved.

In the present example, a construction is used which is devised so that in cases where the read-out of data is requested by the host 10, it is detected whether or not an uncorrectable error has occurred, and in cases where the occurrence of an uncorrectable error is detected, data recovery processing 221 and data matching check processing 223 are performed. Accordingly, the reliability of the disk drives 310 can be checked as required. Meanwhile, for example, in the case of a write request, a method is also conceivable in which data written into the disk drives 310 is read out and compared with the write data remaining in the cache memory 250. In this case, however, each time that data is written into a disk drive 310, this data must be read out; accordingly, the write processing speed is greatly reduced, and the load on the controller 200 also increases. In the present example, on the other hand, since a parity matching check is performed at the time of the read request, the processing burden can be alleviated compared to that in a case where data is written in while being confirmed at the time of the write request.

In the present example, a construction is used which is devised so that in cases where an uncorrectable error is detected, data recovery processing 221 is first performed, and the data requested by the host 10 is transferred to the host 10; next, parity matching check processing 223 is performed, and a check is made as to whether or not the data of the respective blocks in the unconfirmed region is normal. Accordingly, a severe drop in the response characteristics can be prevented, so that the reliability can be improved.

2. Second Example

A second example will be described with reference to FIG. 9. The respective examples including the present example correspond to modifications of the first example. In the present example, the reliabilities of the respective blocks in a specified region following the error block are checked one at a time.

Figure 9:
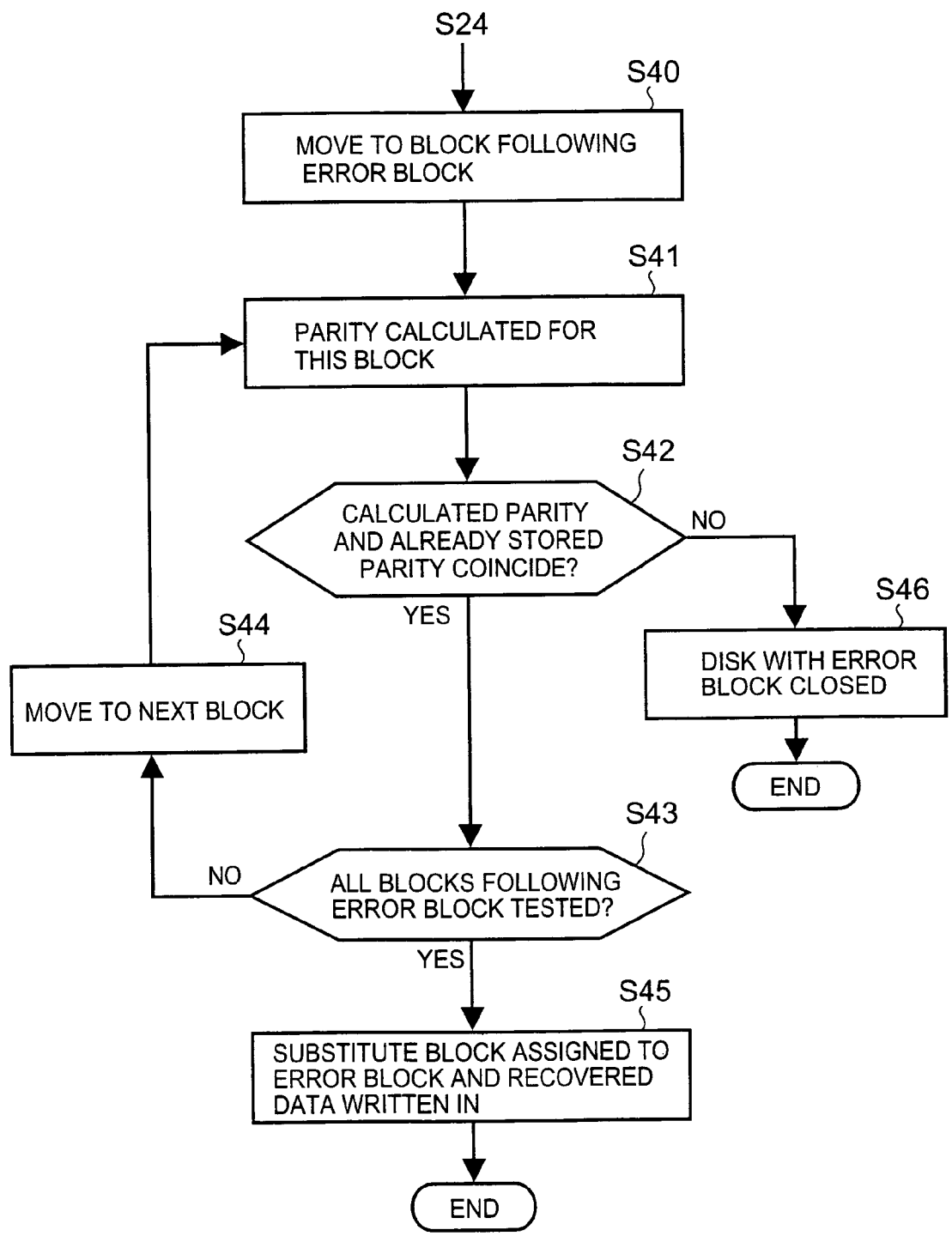
FIG. 9 is a flow chart showing the essential parts of the read request processing that is performed by the storage control device in a second example.

FIG. 9 is a flow chart showing the essential parts of the read processing. This flow chart continues from S24 in FIG. 7. When an uncorrectable error is detected (S24: YES), the controller 200 moves a pointer to the block that immediately follows the error block (S40).

The controller 200 recalculates the parity data for this block (S41), and judges whether or not this newly calculated new parity data coincides with the old parity data already stored on the parity disk (S42). In cases where both sets of parity data coincide (S42: YES), the data stored in this block is judged to be correct. Then, the controller 200 judges whether or not reliability has been tested for the respective blocks in a specified range following the error block (S43). In cases where even one untested block remains (S43: NO), the controller 200 moves the pointer to the next block (S44), and respectively repeats the abovementioned processing of S41 and S42.

In cases where the reliability of the stored data has been tested for all of the blocks within the specified range (S43: YES), i.e., in cases where the reliability of a specified number of blocks following the error block has been confirmed, the controller 200 assigns an extra substitute block to the error block, and writes the recovered data into the substitute block (S45); then, the controller 200 ends this processing.

On the other hand, in cases where the new parity data that has been recalculated for these blocks and the old parity data that has already been stored do not coincide (S42: NO), the controller 200 performs closing processing on the disk drive that has the error block regardless of the presence or absence of untested blocks (S46).

The same effects as those in the first example can also be obtained in the present example constructed as described above. In addition, in the present example, a construction is used in which the reliabilities of a specified number of blocks following the error block are checked one at a time, and the disk drive 310 is immediately closed at the point in time at which a block storing incorrect data is detected.

Accordingly, in cases where incorrect data is stored in a nearby block following the error block, the parity matching check processing 223 can be completed in a short time. Specifically, in cases where a block that behaves as though this block has been updated in a normal manner in spite of the fact that the block has not been updated is positioned immediately after the error block, the controller 200 immediately detects the block storing incorrect data, and can perform closing processing on the disk drive 310.

3. Third Example

A third example will be described with reference to FIG. 10. In the present example, recovery is accomplished using a substitute block without closing the disk drive 310.

Figure 10:
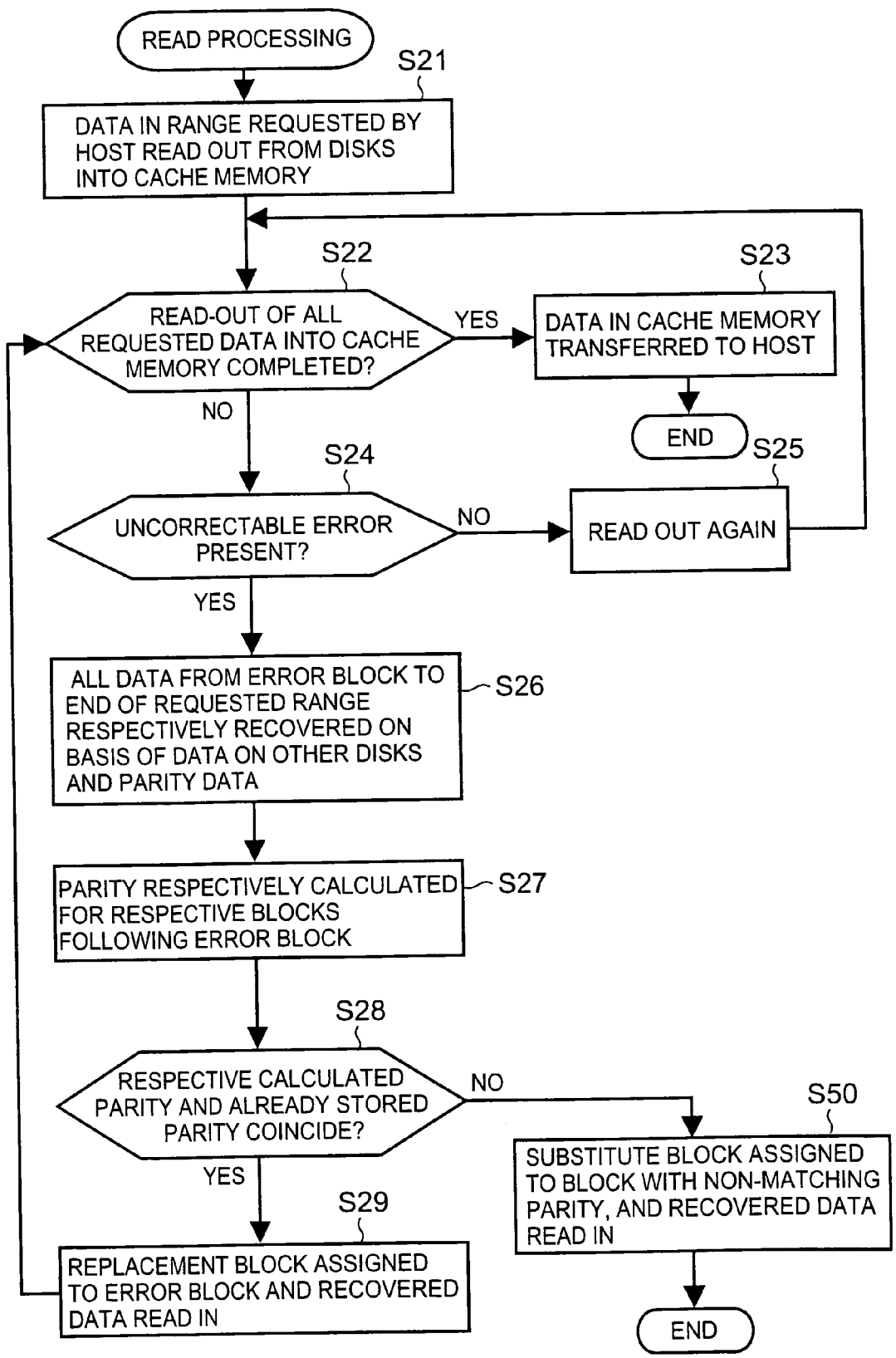
FIG. 10 is a flow chart showing the read request processing that is performed by the storage contents in a third example.

FIG. 10 is a flow chart showing the read processing. This flow chart comprises all of S21 through S29 described with reference to FIG. 7. The description of identical steps is omitted, and only the characterizing parts are described in the present example.

In cases where the new and old parity data for even a single block in the unconfirmed region, i.e., even a single block among the respective blocks in the specified range, do not coincide (S28: NO), the controller 200 restores the block storing the incorrect data (S50); furthermore, the controller 200 assigns an extra substitute block to this block, and writes the data recovered for this block into the substitute block.

The same effects as those in the first example can also be obtained in the present example constructed as described above. In addition, in the present example, since blocks are restored and continue to be used without performing closing processing on the disk drive 310, the operating costs can be reduced while improving the liability. Moreover, for example, in cases where the specified value of the number of blocks restored is exceeded, closing processing can be performed on the disk drive 310 in question. Furthermore, a construction may also be used in which the user is prompted to add a new extra drive via the control terminal 20 in cases where blocks are restored.

4. Fourth Example

A fourth example will be described with reference to FIG. 11. In the present example, parity matching check processing 223 is performed at the time that diagnosis is performed either periodically or aperiodically.

Figure 11:
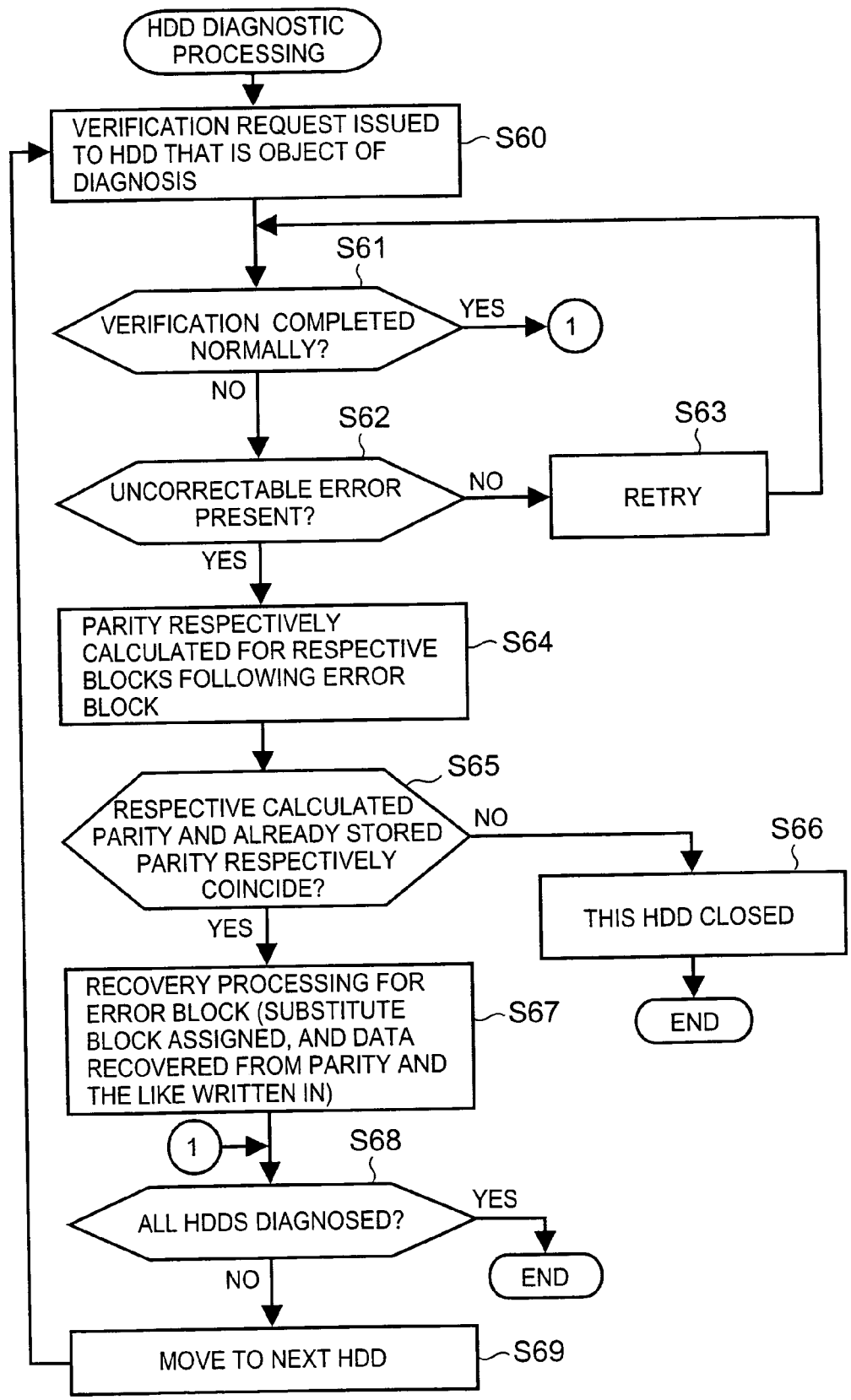
FIG. 11 is a flow chart showing the drive diagnostic processing that is performed by the storage control device in a fourth example.

FIG. 11 is a flow chart showing modified HDD diagnostic processing. HDD diagnostic processing is one type of self-diagnostic program provided in the disk array subsystem 100. For example, this processing can be performed on holidays, at night on ordinary weekdays or the like, when the I/O burden on the disk array subsystem 100 is light.

The controller 200 issued a verification request to the disk drive 310 that is the object of diagnosis (indicated as "HDD" in FIG. 11) (S60). For example, the disk drive 310 that receives this verification request performs self-diagnosis on the basis of an ECC or the like. The controller 200 then judges whether or not this verification has been completed in a normal manner (S61). In cases where this verification has been completed in a normal manner (S61: YES), the controller 200 moves to S68 via a link 1.

The controller 200 judges whether or not all of the disk drives 310 that are to be diagnosed have been diagnosed (S68). In cases where undiagnosed disk drives 310 remain (S68: NO), the controller 200 selects the next disk drive 310 as the object of diagnosis (S69), and diagnoses whether or not this disk drive 310 is normal (S60, S61); then, in cases where diagnosis has been completed for all of the disk drives 310 (S68: YES), the controller 200 ends this processing.

On the other hand, in cases where the verification was not completed in a normal manner (S61: NO), the controller 200 judges whether or not an uncorrectable error has occurred (S62). In cases where no uncorrectable error has occurred (S62: NO), the controller 200 again causes verification processing to be performed (S63). In cases where verification cannot be performed in a normal manner even after being repeated a specified number of times or more, the controller 200 may also end this processing (not shown in the figures).

In cases where the reason that verification could not be completed in a normal manner is an uncorrectable error (S62: YES), the controller 200 respectively recalculates the parity data for the respective blocks within a specified range following the error block (S64). The controller 200 judges whether or not these respective calculated sets of new parity data and the respective sets of old parity data coincide (S65).

In cases where all of the respective sets of new and old parity data for the respective blocks within the specified range coincide (S65: YES), the controller 200 performs restoration processing (recovery processing) on the error block as described in the abovementioned examples (S67). Then, the controller 200 judges whether or not all of the disk drives 310 that are to be diagnosed have been diagnosed (S68). In cases where undiagnosed disk drives 310 remain (S68: NO), the controller 200 moves to the next disk drive 310 (S69), and issues a verification request to this disk drive 310 (S60).

On the other hand, in cases where even one combination of new and old parity data for the respective blocks within the specified range does not coincide (S65: NO), the controller 200 now performs closing processing for the disk drive 310 being diagnosed (S66).

Thus, the controller 200 tests for the presence or absence of uncorrectable errors 200 while diagnosing all of the disk drives 310 that are to be diagnosed, and in cases where an uncorrectable error is detected, the controller 200 checks the reliability of the data for the respective blocks in the unconfirmed region. Then, in cases where the diagnosis has been completed for all of the planned disk drives 310 (S68: YES), this processing ends.

Effects similar to those of the first example can also be obtained in this example. In addition, in the present example, since a parity matching check is also performed at the same time as the HDD diagnosis, the detection rate of blocks in which there is a danger of incorrect data being stored can be increased, so that the reliability can be improved to a much greater extent. Furthermore, since the HDD diagnosis processing can be executed at times during which there is little burden on the disk array subsystem 100, the reliability can be checked and recovered without lowering the performance of the storage system to any great extent.

5. Fifth Example

A fifth example will be described with reference to FIG. 12. In the present example, in cases where an uncorrectable error is detected, if the block following the error block is normal by a specified value Ct or greater, a subsequent parity check is omitted.

Figure 12:
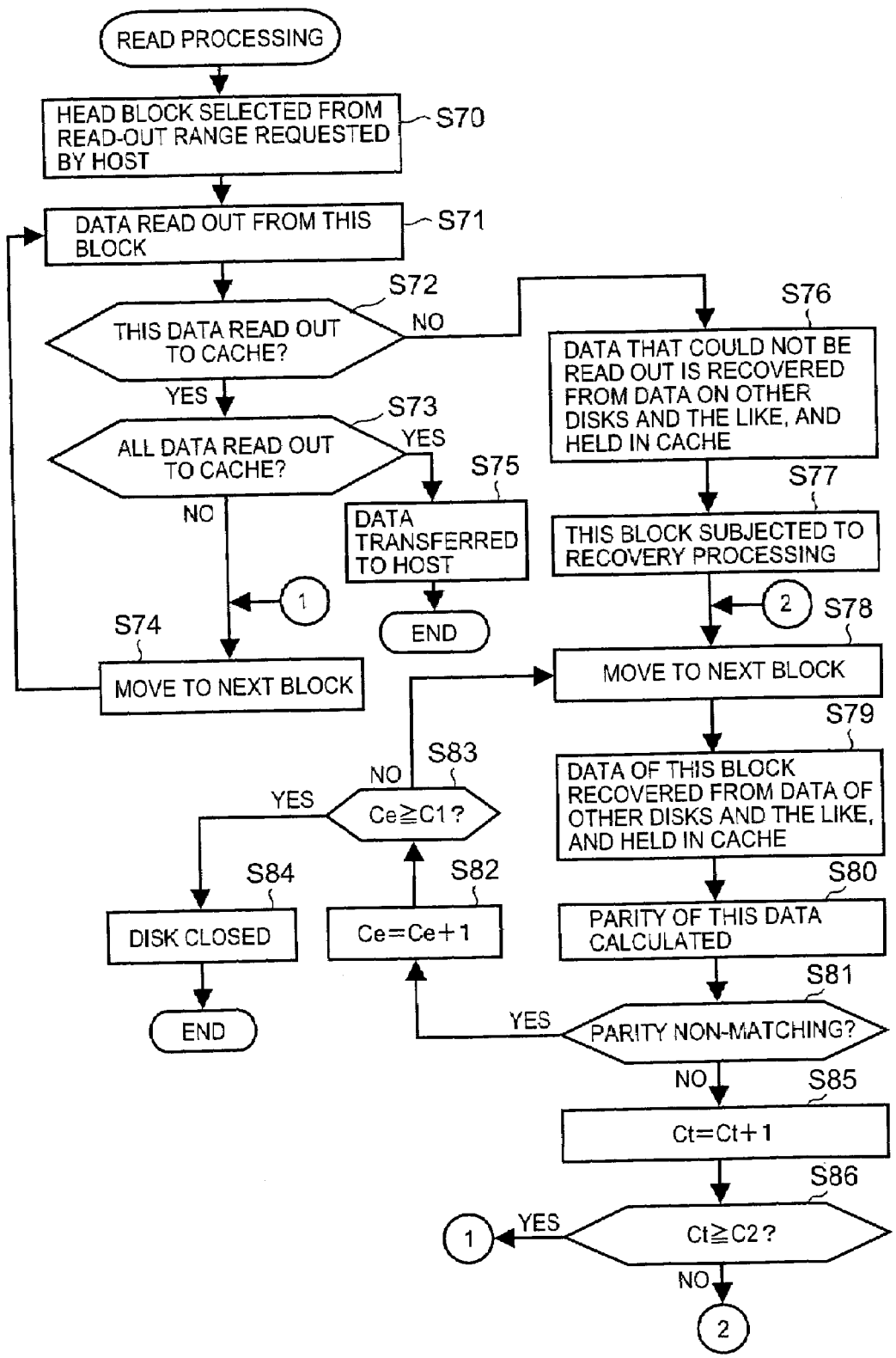
FIG. 12 is a flow chart showing the read request processing that is performed by the storage control device in a fifth example.

FIG. 12 is a flow chart showing the read request processing. The controller 200 selects the block positioned at the head of the requested read-out range on the basis of a read command from the host 10 (S70).

The controller 200 reads out the data from the head block, above-described stores this data in the cache memory 250

(S71). The controller 200 then judges whether or not data was successfully read out from the head block (S72).

In cases where data was read out in a normal manner (S72: YES), the controller 200 judges whether or not all of the requested data (or data corresponding to the data size that can be transferred in one transfer) was successfully read out into the cache memory 250 (S73). In cases where not all of the data has been collected (S73: NO), the controller 200 moves to the next block (S74), reads out data from this block, and stores this data in the cache memory 250 (S71). Then, when the requested data has been stored in the cache memory 250 (S73: YES), the controller 200 transfers this data to the host 10 (S75).

The abovementioned S70 through S75 are executed in cases where data was successfully read out from the disk drive 310 without any problems. On the other hand, in cases where data cannot be read out in a normal manner from a certain block (S72: NO), the controller 200 restores the data that could not be read out on the basis of parity data and the like, and stores this restored data in the cache memory 250 (S76). Then, the controller 200 performs restoration processing on this error block, and writes the recovered data into a substitute block (S77).

The controller 200 moves to the block immediately following the error block (S78). The controller 200 recovers the data of this block from parity data and the like regardless of the reliability of the data of this block, and stores the recovered data in the cache memory 250 (S79).

Next, the controller 200 again calculates parity data for this block (S80), and judges whether or not this parity data coincides with the parity data already stored for this block (S81). In cases where the new and old parity data for this block do not coincide (S81: YES), the controller 200 adds an increment of 1 to the value of the counter Ce that is used to count parity errors (S82).

The controller 200 judges whether or not the value of the parity error counter Ce is equal to or greater than a preset specified first threshold value C1 (S83). The threshold value C1 can be set at 0. In cases where the value of the parity error counter Ce is equal to or greater than the threshold value C1 (S83: YES), the controller 200 performs closing processing for the disk drive 310 (S84). Furthermore, although this is omitted from the figures, an extra substitute block can be assigned to this block and the block can be restored in cases where parity non-matching is detected (S81: YES).

In cases where the value of the parity error counter Ce is less than the threshold value C1 (S83: NO), the controller 200 further moves to the next block (S78), recovers the data of this block (S79), and then checks the parity matching (S80, S81).

In cases where the new and old parity match (S81: NO), the controller 200 increases the value of the normal block number counter Ct that is used to count the number of blocks that pass the parity matching check by 1 (S85). The controller 200 then judges whether or not the value of the normal block number counter Ct is equal to or greater than a preset second threshold value C2 (S86). For example, this threshold value C2 can be set at an integer equal to or greater than 0.

In cases where the number of blocks Ct that have passed the parity matching check is equal to or greater than C2 (S86: YES), the controller 200 judges that the respective subsequent blocks are normal, ends the parity matching check processing, and moves to S74. In cases where Ct is less than C2 (S86: NO), the controller 200 moves to the next block (S78), recovers data for this block (S79), and checks the parity matching (S80, S81).

Furthermore, a construction may also be used which is devised so that in cases where parity non-matching is detected (S81: YES), the value of the normal block number counter Ct is reset.

The same effects as those obtained in the first example can also be obtained in the present example constructed as described above. In addition to this, in the present example, a construction is used in which the parity matching check is ended in cases where the number of blocks Ct that have passed the parity matching check (S80, S81) is equal to or greater than a specified threshold value C2. Accordingly, the performance of wasteful parity matching checks in cases where there are no abnormalities in blocks other than the error block can be prevented, so that the processing burden on the disk array subsystem can be lightened. In other words, a parity matching check can be performed only in the range where confirmation is necessary, so that the reliability can be improved while lightening the processing burden.

In the present example, a construction is used in which disk drives 310 in which parity non-matching equal to or greater than a specified value C1 is detected are subjected to closing processing. Accordingly, the operating costs can be lowered while improving the reliability.

6. Sixth Example

A sixth example will be described with respect to FIG. 13 and FIG. 14. In the present example, the range for which parity matching is checked is determined in accordance with the drive type of the disk drives 310.

Figure 13:
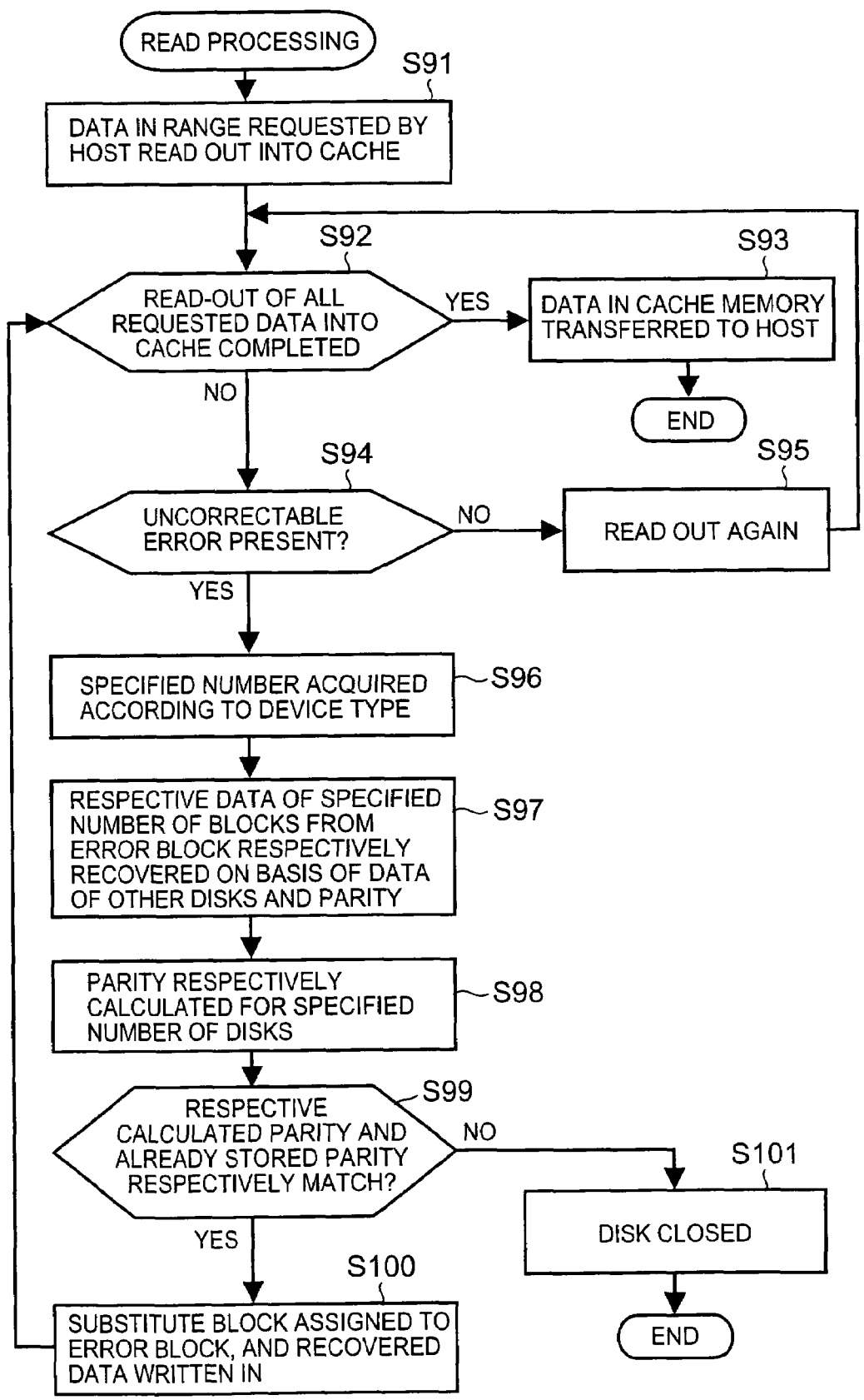
FIG. 13 is a flow chart showing the read request processing that is performed by the storage control device in a sixth example.

FIG. 13 is a flow chart showing the read processing. This flow chart comprises steps corresponding to the steps shown in FIG. 7. S91 through S95 respectively correspond to S21 through S25 in FIG. 7, and the same processing is performed in these steps; accordingly, a description is omitted.

In cases where an uncorrectable error is detected (S94: YES), the controller 200 refers to a parity check block number control table T1, and acquires a check block number BN that corresponds to the type of disk drive 310 involved (S95).

An example of the construction of this control table T1 is shown in FIG. 14. A block number BN for which a parity matching check is performed is registered beforehand in the control table T1 for each type of disk drive 310. The controller 200 respectively recovers data for the respective blocks of a specified number BN following the error block (S97), and respectively performs a parity matching check for the respective blocks of this specified number BN (S98, S99).

As in the abovementioned first example, in cases where the new and old parity data coincide (S99: YES), the controller 200 restores the error block (S100), and returns to S92. In cases where the new and old parity data do not coincide (S99: NO), the controller 200 closes the disk drive 310 (S101).

Since the present example is constructed as described above, the same effects as those obtained in the abovementioned first example can be obtained. In addition to this, in the present example, since the block number BN for which a parity matching check is to be performed is determined in accordance with the type of the disk drive 310, the reliability of the respective blocks can be confirmed in accordance with the type of the disk drive 310.

In the present example, a construction is used in which a parity matching check is performed for a specified number (BN) of blocks among the respective blocks that follow the error block. Accordingly, in cases where this specified number BN is set as the maximum number of blocks that can be transferred from the disk drive 310 in a single transfer, a parity matching check (parity check) is performed when the read-out range requested by the host 10 is exceeded. Frequency, a case was indicated in which data recovery and a parity check were preformed a number of times corresponding to this specified number BN; instead of this however, it would also be possible to use a construction in which the number of blocks for which data is recovered and the number of blocks for which a parity check is performed are different. For example, the range from the error block to the block at the tail end of the read-out range may be set as the data recovery range, and the range from the block immediately following the error block to the maximum transferable block number may be set as the parity checking range.

7. Seventh Example

Figure 15:
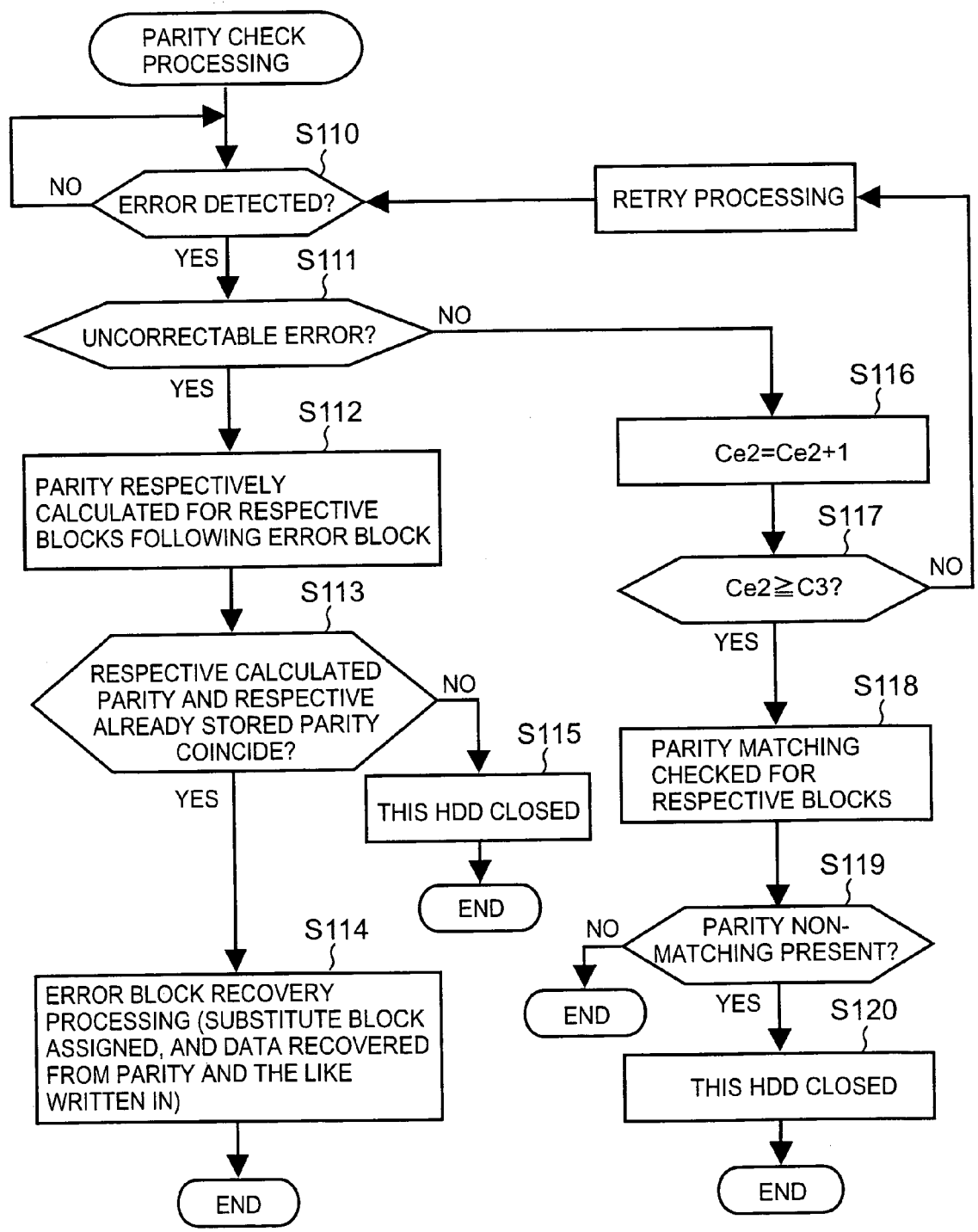
FIG. 15 is a flow chart showing the parity check processing that is performed by the storage control device in a seventh example.

A seventh example will be described with reference to FIG. 15. In this example, specified processing relating to the uncorrectable error (data recovery and detection of incorrect data) is performed on the basis of the detection of errors other than the abovementioned uncorrectable error.

For each disk drive 310, the controller 200 respectively monitors whether or not any errors including uncorrectable errors have occurred (S110). Here, for example, errors other than uncorrectable errors may include interface errors and the like.

When the controller 200 detects the occurrence of an error (S110: YES), the controller 200 judges whether or not this detected error is an uncorrectable error (S111). In cases where this error is an uncorrectable error (S111: YES), the controller 200 respectively recalculates parity data for the respective blocks in a specified range following the this error block (S112), and performs a parity matching check (S113). In cases where the new and old parity data coincide (S113: YES), the controller 200 performs recovery processing of the error block (S114). In cases where the new and old parity data do not coincide (S113: NO), the controller 200 performs closing processing for the disk drive 310 (S115).

On the other hand, in cases where an error other than an uncorrectable error is detected (S111: NO), the controller 200 increases the value of the error counter Ce2 used to count the number of occurrences of errors by 1 (S116). The controller 200 judges whether or not the value of the error counter Ce2 is equal to or greater than a third threshold value C3 (S117). In cases where Ce2 is less than C3 (S117: NO), the controller 200 returns to S110 after performing retry processing.

In cases where the value of the error counter Ce2 is equal to or greater than the threshold value C3 (S117: YES), the controller 200 respectively checks the parity matching of the respective blocks for this disk drive 310 (S118). In cases where parity non-matching is detected (S119: YES), the controller 200 performs closing processing for the disk drive 310 (S120).

The same effects as those obtained in the first example can also be obtained in the present example constructed as described above. In addition to this, in the present example, a parity matching check of the respective blocks is executed with the number of times of occurrence of other errors as a trigger. Accordingly, reliability can be confirmed in advance for disk drives 310 in which errors have occurred a number of times equal to or greater than the specified number C3.

8. Eighth Example

Figure 16:
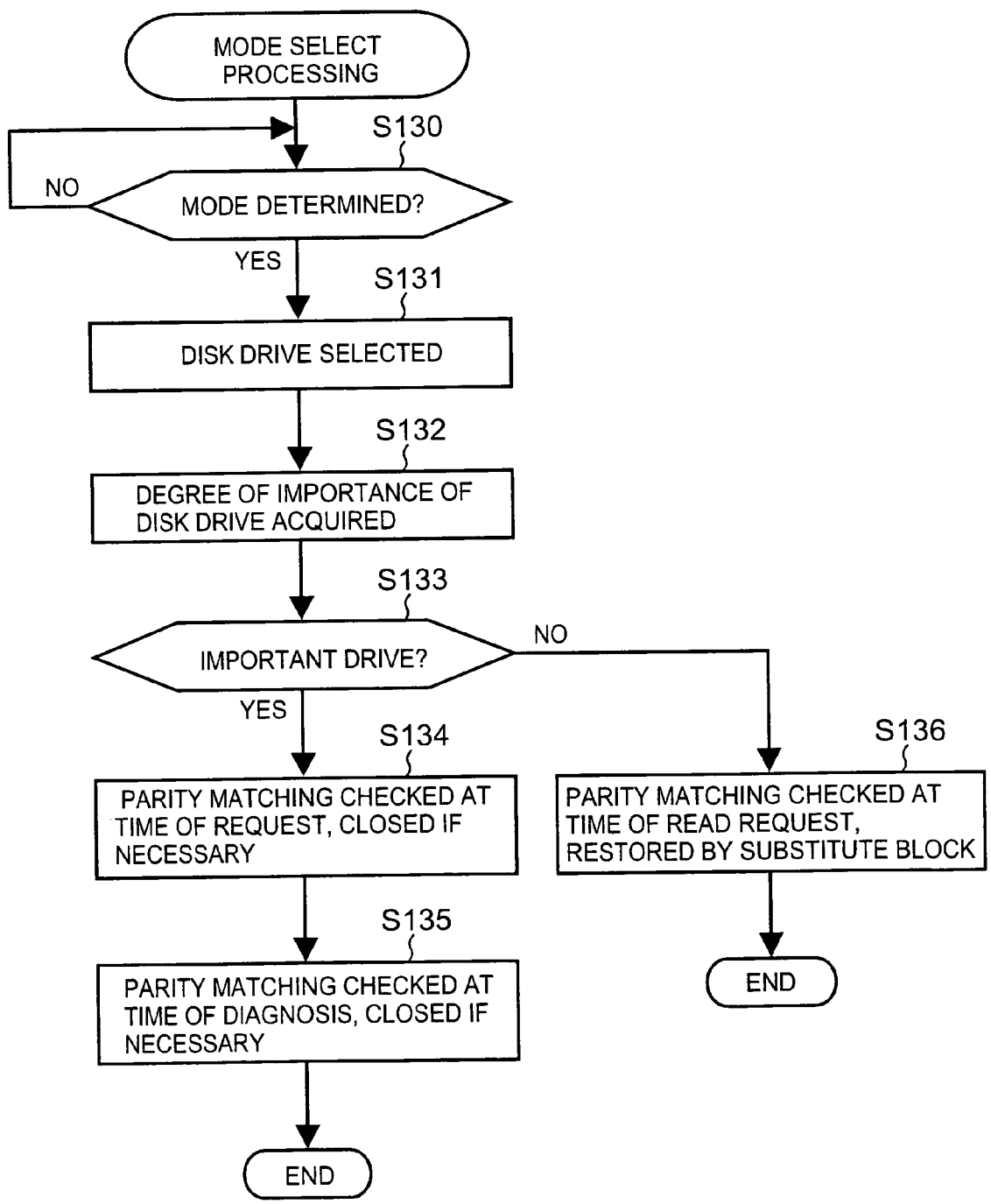
FIG. 16 is a flow chart showing the reliability maintenance mode determining processing that is performed by the storage control device in an eighth example.

An eighth example will be described with reference to FIG. 16. In the present example, the system is devised so that a plurality of modes used to maintain reliability are provided, and respectively different modes can be set for each of the respective disk drives 310.

A plurality of different types of reliability maintenance modes can be constructed by combining attributes such as the timing (type of trigger) that initiates the parity matching check, measures that are taken in cases where parity non-matching is discovered (closing processing or recovery processing and the like as in the respective examples described above.

Meanwhile, for example, the disk drives 310 can be classified into a plurality of types by combining attributes such as the drive type, value of the data stored in the drive and the like. For example, the "value of the data" refers to the utilization value of the data, i.e., the access frequency or the like. Generally, data immediately following production by an application program 11 has a high access frequency, and this access frequency drops as time passes.

In the present example, the system is devised so that an appropriate reliability maintenance mode can be set in accordance with the characteristics of the respective disk drives 310. The setting of such modes can be performed manually by the user, or can be performed automatically according to a policy that is set beforehand. Furthermore, modes that are automatically set according to a policy can be manually altered by the user.

In the present example, a cases in which the user sets the mode using the control terminal 20 will be described as an example. The controller 200 ascertains whether or not a designation of the mode has been issued by the control terminal 20 (S130).

The controller 200 selects the disk drive 310 designated by the control terminal 20 (S131), and acquires the importance of this disk drive 310 (S132).

Here, the importance of the disk drive 310 refers to the positioning of this disk drive 310 in the disk array subsystem 100. For example, disk drives 310 that are used in on-line volumes have a high importance. On the other hand, for example, disk drives 310 that are used in archive volumes may have a relatively low importance compared to drives that are used in on-line volumes. Furthermore, for example, the importance of a disk drive 310 may vary according to the type of data that is stored in this disk drive 310. Furthermore, for instance, there are also cases in which high-performance disk drives such as FC disks or the like have an upper importance than low-performance disk drives such as ATA disks or the like.

In the present example, the importance of the disk drives 310 is clearly indicated by the user; however, a construction may also be used in which the importance is automatically calculated on the basis of the drive type, data type, volume type or the like as described above.

When the controller 200 acquires the importance of the selected disk drive 310, the controller 200 judges whether or not this disk drive 310 is an important drive (S133). In cases where this drive is an important drive (S133: YES), the controller 200 applies a mode that has high reliability for this disk drive 310 (S134, S135).

Specifically, in cases where a read request is issued by the host 10 for an important disk drive 310, a parity matching check is performed, and closing processing is performed in cases where parity non-matching is detected (S134). Furthermore, in addition to this, a parity matching check is also performed when HDD diagnostic processing is performed for an important disk drive 310, and closing processing is performed in cases where parity non-matching is detected (S135).

Conversely, in the case of a disk drive 310 that is not important (S133: NO), the controller 200 uses a mode with low reliability for this disk drive 310. For example, the controller 200 performs a parity matching check only in cases where a read request is issued by the host 10 (S136). Furthermore, the controller 200 assigns a substitute block to the block storing the incorrect data, and performs recovery processing (S136).

Furthermore, the concrete contents of the modes are not limited to the abovementioned examples; various types of modes can be used. Moreover, a construction may also be used in which the mode that is applied is controlled on the basis of the "reliability of the disk drive" instead of the importance of the disk drive". For instance, in cases where a disk drive other than the recommended part is mounted in the storage part 300, the monitoring of the generation of incorrect data can be strengthened by using a high-reliability mode for disk drives that have a low reliability. Alternatively, a construction may be used in which a plurality of different types of parity matching checks (S134, S135) are performed in the case of a drive with low reliability compared to that of an FC disk, such as an SATA disk, and in which a parity matching check is as a rule not performed in the case of a high-reliability disk such as an FC disk.

Furthermore, the present invention is not limited to the respective examples described above. Various additions, alterations and the like may be made by a person skilled in the art within the scope of the present invention.

What is claimed is:

1. A storage control device which is respectively connected to a host device and a plurality of storage devices, comprising:
    an upper communications part for performing communications with said host device;
    a lower communications part for performing communications with each of said respective storage devices; and
    a control part which constructs a redundant storage region by means of said respective storage devices, and which inputs and outputs data into and from said redundant storage region via said lower communications part on the basis of instructions from said host device received via said upper communications part; wherein
    said control part detects whether or not a specified error has occurred in any of said respective storage devices, and in cases where said specified error is detected, respectively performs specified processing relating to said specified error for at least a unit storage region within a specified range contiguous with an error unit storage region in which said specified error was detected, among a plurality of unit storage regions belonging to one of the storage devices in which said specified error was detected.

2. The storage control device according to claim 1, wherein said redundant storage region is constructed by dispersing and respectively storing data received from said host device in a plurality of storage devices constituting at least some of the storage devices among said respective storage devices, and storing the parity data obtained on the basis of said data in at least one storage device among said respective storage devices.

3. The storage control device according to claim 1, wherein said specified error is an error in which the data stored in said error unit storage region cannot be read out in a normal manner.

4. The storage control device according to claim 2, wherein said specified error is an error in which the data stored in said error unit storage region must be recovered on the basis of other data and parity data relating to the data stored in said error unit storage region.

5. The storage control device according to claim 1, wherein said specified processing is processing that recovers data stored in the unit storage regions within said specified range.

6. The storage control device according to claim 2, wherein said specified processing is processing that respectively recovers data that is respectively stored in said error unit storage region and unit storage regions within said specified range on the basis of other data and parity data relating to these respective sets of data.

7. The storage control device according to claim 6, wherein said control part stores said respective sets of recovered data in other normal unit storage regions when said specified processing is performed.

8. The storage control device according to claim 1, wherein said specified processing is processing that tests the reliability of the data that is stored in the unit storage regions within said specified range.

9. The storage control device according to claim 2, wherein said specified processing is processing that recovers data stored in the unit storage regions within said specified range on the basis of other data and parity data relating to said data, and compares new parity data obtained from this restored data with parity data that has already been stored in order to test whether or not both of these sets of parity data coincide.

10. The storage control device according to claim 1, wherein said specified processing includes data recovery processing that recovers data respectively stored in said error unit storage region and the unit storage regions within said specified range, and reliability testing processing that tests the reliability of the data stored in the unit storage regions within said specified range.

11. The storage control device according to claim 1, wherein said control part further closes the storage device in which said specified error has occurred when said specified processing is executed.

12. The storage control device according to claim 1, wherein said specified range is determined as the maximum number of unit storage regions that can be transferred to said upper device via said upper communications part.

13. The storage control device according to claim 1, wherein said specified range is determined on the basis of a range indicated by said host device.

14. The storage control device according to claim 10, wherein said specified range is respectively different in said data recovery processing and said reliability testing processing.

15. The storage control device according to claim 1, wherein it is detected whether or not a specified error has occurred in any of said respective storage devices when a read request from said host device is received by said upper communications part.

16. The storage control device according to claim 1, wherein said control part can test, either periodically or aperiodically, a diagnosis as to whether or not said respective storage devices are operating normally, and detects whether or not a specified error has occurred in any of said respective storage devices when this diagnosis is performed.

17. The storage control device according to claim 1, wherein said control part further monitors whether or not other errors of a different type than said specified error have occurred in any of said respective storage devices, and tests the reliability of the data respectively stored in said unit storage regions belonging to said respective storage devices on the basis of the conditions of occurrence of said other errors.

18. A storage device error control method for use in cases where a specified error occurs in a plurality of storage devices that provide a redundant storage region constructed using parity data for a host device, said method comprising the steps of:
   judging whether or not a preset specified timing has arrived;
   detecting whether or not said specified error has occurred in any of said respective storage devices in cases where it is judged that said specified timing has arrived; and
   in cases where said specified error is detected, executing specified processing related to said specified error for at least a unit storage region within a specified range contiguous to an error unit storage region in which said specified error is detected among a plurality of unit storage regions belonging to one of the storage devices in which said specified error is detected.

19. The storage device error control method according to claim 18, wherein said step of executing said specified processing includes the steps of:
   respectively recovering the data stored in said error unit storage region and the unit storage regions within said specified range on the basis of other data and parity data respectively relating to these sets of data; and
   comparing new parity data obtained from the recovered data relating to the unit storage regions within said specified range with parity data that has already been stored in order to test whether or not both sets of parity data coincide.

20. A storage control device which is respectively connected to host device and a plurality of storage devices, comprising:
   an upper communications part for performing communications with said host device;
   a lower communications part for performing communications with each of said respective storage devices;
   a control part which constructs a redundant storage region that uses parity data by means of said respective storage devices, and which inputs and outputs data into and from said redundant storage region via said lower communications part on the basis of instructions from said upper device received via said upper communications part; and
   a memory used by this control part;
   wherein said control part respectively executes the steps of:
   judging whether or not a read request for data has been issued by said host device;
   successively reading out data from the respective blocks of the storage device that stores the requested data in cases where said read request has been issued by said host device, and respectively storing this data in said memory;
   detecting any error block in which said data could not be normally read out among said respective blocks;
   respectively recovering the data stored in the respective blocks located from said error block to the block corresponding to the tail end of a read-out range designated by said read request, this recovery being accomplished on the basis of other data and parity data respectively relating to these sets of data, and storing these respective sets of recovered data in said memory;
   when all of the data contained in said read-out range has been stored in said memory, transferring these sets of data to said host device;
   respectively producing new parity data on the basis of the respective sets of recovered data relating to respective specified blocks located from the block positioned immediately after said error block to the block corresponding to the tail end of said read-out range;
   judging whether or not the respective sets of old parity data already stored in memory for the data stored in said respective specified blocks and said respective sets of new parity data that are newly produced coincide; and
   closing one of the storage devices that has said error block in cases where even one combination of said respective sets of old parity data and said respective sets of new parity data does not coincide.

* * * * *